(12) United States Patent  
Akiyama

(10) Patent No.: US 8,692,922 B2  
(45) Date of Patent: Apr. 8, 2014

(54) IMAGE PICKUP APPARATUS

(75) Inventor: Satoru Akiyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 290 days.

(21) Appl. No.: 13/315,393

(22) Filed: Dec. 9, 2011

(65) Prior Publication Data  
US 2012/0147244 A1 Jun. 14, 2012

(30) Foreign Application Priority Data

Dec. 10, 2010 (JP) ................................. 2010-275773

(51) Int. Cl.  
*H04N 5/222* (2006.01)  
*H04N 5/225* (2006.01)

(52) U.S. Cl.  
USPC ...................................... 348/333.06; 348/373

(58) Field of Classification Search  
USPC ............................................ 348/333.06, 373  
See application file for complete search history.

(56) References Cited

FOREIGN PATENT DOCUMENTS

JP 2005210677 A 8/2005

*Primary Examiner* — Kelly L Jerabek  
*Assistant Examiner* — Stephen Coleman  
(74) *Attorney, Agent, or Firm* — Rossi, Kimms & McDowell LLP

(57) ABSTRACT

An image pickup apparatus capable of giving a shooter the same rotary operation feeling regardless of the rotating direction, and displaying an erect image to a shooter at all times. A two-axis hinge is provided with a first bearing that supports a display unit rotatably in right and left directions and a second bearing that supports the display unit in rotated states rotatably so as to direct the screen to front and rear sides. A first axial rotation detector detects the rotation of the display unit by the first bearing. A second axial rotation detector detects the rotation of the display unit in the rotated states by the second bearing to direct the screen to the front and rear sides. A control unit switches display orientation of an image displayed on the display unit based on detection results from the first and second axial rotation detectors.

8 Claims, 23 Drawing Sheets

IMAGE PICKUP APPARATUS

BACKGROUND OF THE INVENTION

1. Field of the Invention

The present invention relates to an image pickup apparatus like a digital still camera, a digital video camera, etc.

2. Description of the Related Art

In some image pickup apparatuses, such as digital still cameras and digital video cameras, a display unit is supported by an apparatus body via a two-axis hinge so as to be able to open and close, and to pivot in an opened state. FIG. 31 through FIG. 33 show an example of this kind of conventional digital video camera (see Japanese Laid-Open Patent Publication (Kokai) No. 2005-210677 (JP 2005-210677A)).

As shown in FIG. 31 and FIG. 32, this digital video camera has a display unit 2 that is supported on the top of a camera body 1 at a front side (a subject side) by a two-axis hinge 3 so to be rotatable about a rotation axis X.

When the display unit 2 in a full close state shown in FIG. 31 is rotated about 180 degrees in the left viewed from the rear side of the camera body 1, the display unit 2 reaches a full open state (FIG. 32), which turns a screen 2a upward. In the full close state (FIG. 31), the screen 2a is retracted so as to face to the front top surface of the camera body 1. In the full open state shown in FIG. 32, the display unit 2 is rotatable around a rotation axis Y that is perpendicular to the rotation axis X of the two-axis hinge 3.

Then, when the display unit 2 in the full open state shown in FIG. 32 is rotated around the rotation axis Y about 90 degrees in the clockwise direction viewed from the left side in the drawing, the display unit 2 reaches a normal shooting state in which the screen 2a turns backward as shown in FIG. 33.

When the display unit 2 in the state shown in FIG. 33 is rotated around the rotation axis Y about 180 degrees, the display unit 2 reaches a state where the screen 2a turns frontward (toward the subject) so that a cameraman or a camerawoman can shoot while viewing his or her own image. When the display unit 2 is rotated so that the screen 2a turns frontward, a changeover switch (not shown) operates at a predetermined angle and the image on the screen 2a is automatically inverted.

Since the display unit 2 of JP 2005-210677A opens only leftward viewed from the rear side with respect to the camera body 1, visibility of the screen 2a becomes poor when viewing from the right rear side, and operability will be lost when there is something that obstructs shooting at the left side viewed from the rear side.

SUMMARY OF THE INVENTION

The present invention provides a mechanism that is capable of rotating a display unit in both of right and left directions viewed from a rear side of a camera body, giving a shooter the same rotary operation feeling regardless of the rotating direction, and displaying an erect image on a screen with respect to the shooter at all times.

Accordingly, a first aspect of the present invention provides an image pickup apparatus comprising an apparatus body, a display unit configured to be provided with a screen for displaying an image, a two-axis hinge configured to be provided with a first bearing that supports the display unit rotatably in right and left directions from a center retracted position viewed from a rear side of the apparatus body, and a second bearing that supports the display unit in rotated states in the right and left directions rotatably so as to direct the screen to front and rear sides of the apparatus body, a first axial rotation detector configured to detect the rotation of the display unit by the first bearing in the right and left directions, a second axial rotation detector configured to detect the rotation of the display unit in the rotated states by the second bearing to direct the screen to the front and rear sides, and a control unit configured to switch display orientation of an image displayed on the display unit based on detection results from the first axial rotation detector and the second axial rotation detector. The control unit switches the display orientation of an image displayed on the display unit according to the rotation direction of the display unit between right and left that is detected by the first axial rotation detector, and the control unit switches the display orientation of an image displayed on the display unit according to the rotation direction of the display unit in the rotated states in the right and left direction between front and rear that is detected by the second axial rotation detector.

According to the present invention, the display unit can rotate in both of right and left directions viewed from the rear side of the camera body, the same rotary operation feeling can be given to a shooter regardless of the rotating direction, and an erect image can be displayed on the screen with respect to the shooter at all times.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
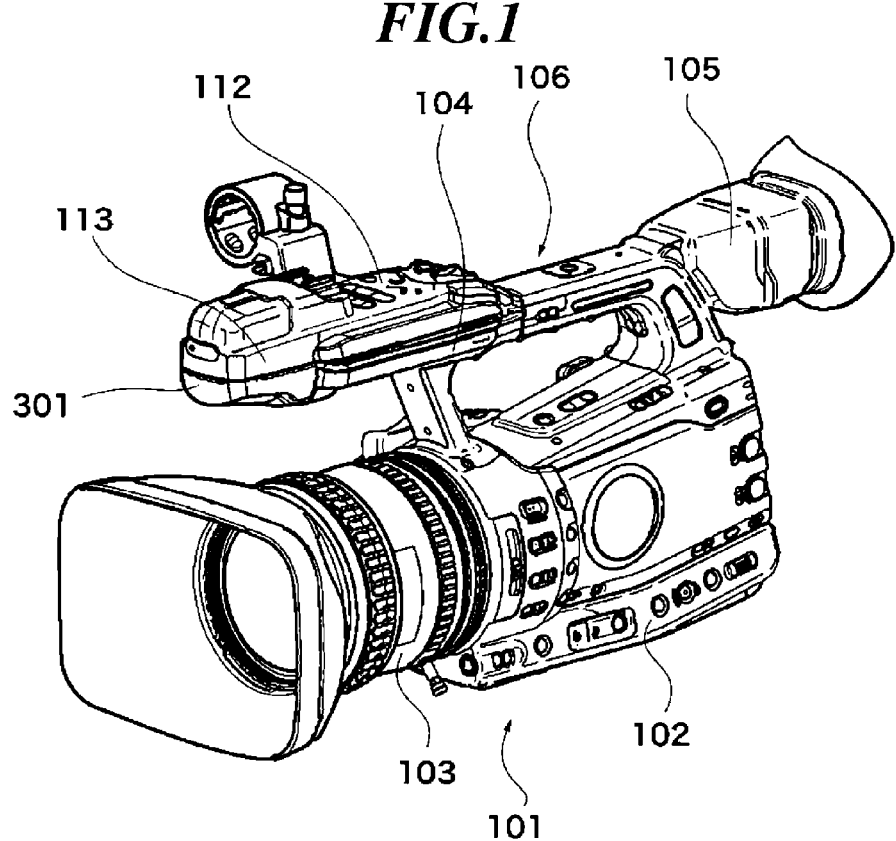
FIG. 1 is a perspective view showing a digital video camera as an image pickup apparatus according to a first embodiment of the present invention viewed from a front side (a subject side).
Figure 2:
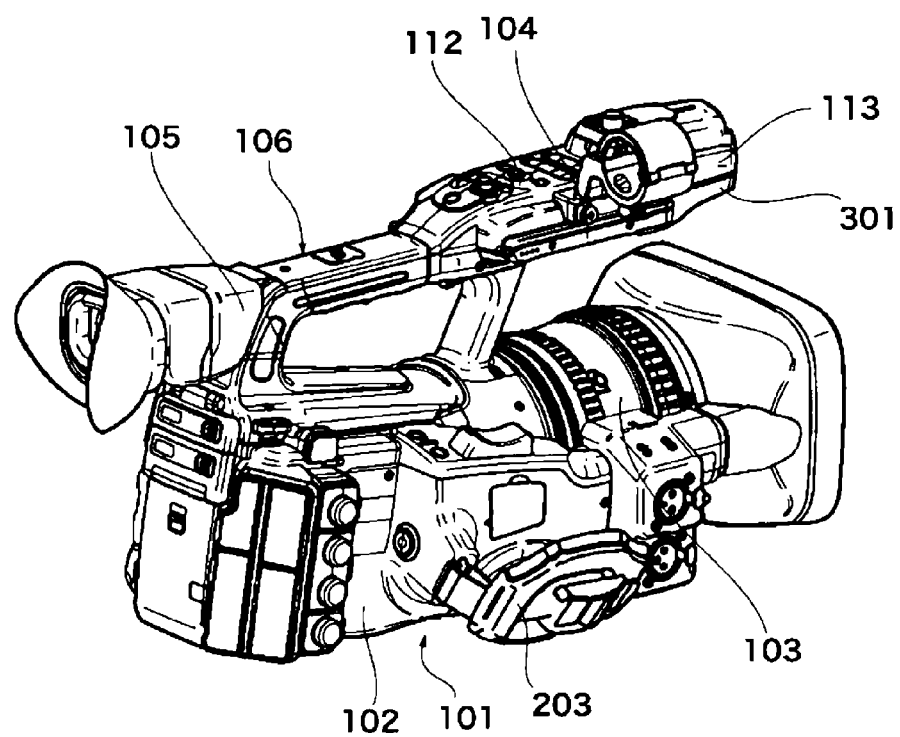
FIG. 2 is a perspective view showing the digital video camera shown in FIG. 1 viewed from a rear side.

FIG. 1 is a perspective view showing a digital video camera as an image pickup apparatus according to a first embodiment of the present invention viewed from a front side (a subject side). FIG. 2 is a perspective view showing the digital video camera shown in FIG. 1 viewed from a rear side.

As shown in FIG. 1 and FIG. 2, the digital video camera 101 of this embodiment is configured by mounting a lens unit 103 to a front side of a camera body 102 and by forming a grip 106 on an upper part. An electronic view finder 105 is mounted at the rear side of the grip 106. A pedestal part 112 is formed at the front side of the grip 106, and a projecting part 113 is formed in front of the pedestal part 112. A microphone (not shown) is built in the projecting part 113.

A grip belt 203 is attached to a right side of the camera body 102 viewed from the rear side. A shooter can grasp the camera body 102 by inserting a hand into a gap between the camera body 102 and the grip belt 203.

A display unit 104 is retracted under the pedestal section 112. The display unit 104 is supported through a two-axis hinge 301, which is provided to an underside of the projecting part 113, so as to be rotatable in both of right and left directions viewed from the rear side of the camera body 102 around a first axis.

Figure 3:
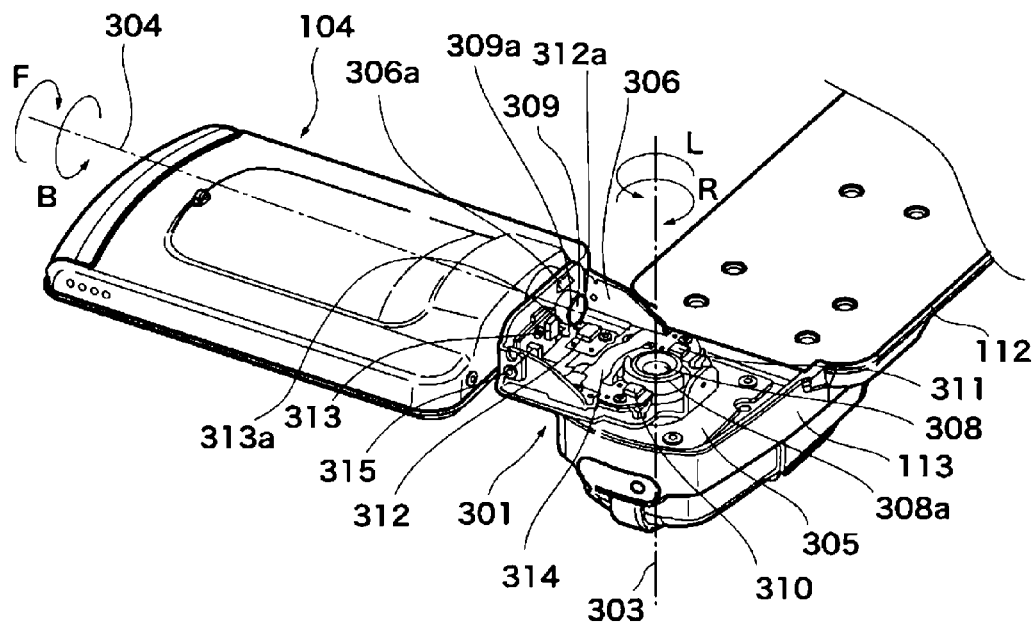
FIG. 3 is a perspective view showing a display unit, which is mounted on a projecting part located at a front side of the digital video camera shown in FIG. 1, and a two-axis hinge, which supports the display unit, viewed from an underside of the projecting part when the display unit is rotated in a left direction viewed from the rear side of the camera body.

FIG. 3 is a perspective view showing the display unit 104 and the two-axis hinge 301 viewed from an underside of the projecting part 113 when the display unit 104 is rotated in the left direction viewed from the rear side of the camera body 102. It should be noted that FIG. 3 shows the state where an armoring cover for the two-axis hinge 301 was detached.

As shown in FIG. 3, a base member 305 of the two-axis hinge 301 is fixed to the under surface of the projecting part 113 with screws and the like. A first bearing 308 is mounted on the base member 305 so that its first axis 303 meets a vertical direction of the camera body 102.

A rotary member 306 is supported by the first bearing 308 so as to be rotatable within ranges of about 90 degrees in the right (R) and left (L) directions, respectively, viewed from the rear side of the camera body 102. A base part of the display unit 104 is rotatably supported by a front edge of the rotary member 306 via a second bearing 309 of which a second axis 304 meets a horizontal direction of the camera body 102.

Here, when the display unit 104 is retracted under the pedestal section 112, a screen 401 of the display unit 104 is arranged so as to face the pedestal section 112. Therefore, when the display unit 104 is rotated in the left (L) direction viewed from the rear side of the camera body 102 via the first bearing 308 from the retracted position, the display unit 104 will be in a state shown in FIG. 4.

In this state, the display unit 104 is rotatable via the second bearing 309 within a range of about 90 degrees in a direction turning the screen 401 frontward (a direction of arrow F in FIG. 3) and a range of about 270 degrees in a direction turning the screen backward (a direction of arrow B in FIG. 3). That is, the display unit 104 is rotatable in an angular range of 270 degrees as a whole.

A peripheral part of the second bearing 309 rotates around the second axis 304 together with the display unit 104. Rotation of the display unit 104 around the second axis 304 of the second bearing 309 is restricted within the angular range mentioned above because a sector projection 309a provided on the peripheral part of the second bearing 309 contacts a stopper 306a formed on the rotary member 306.

Figure 4:
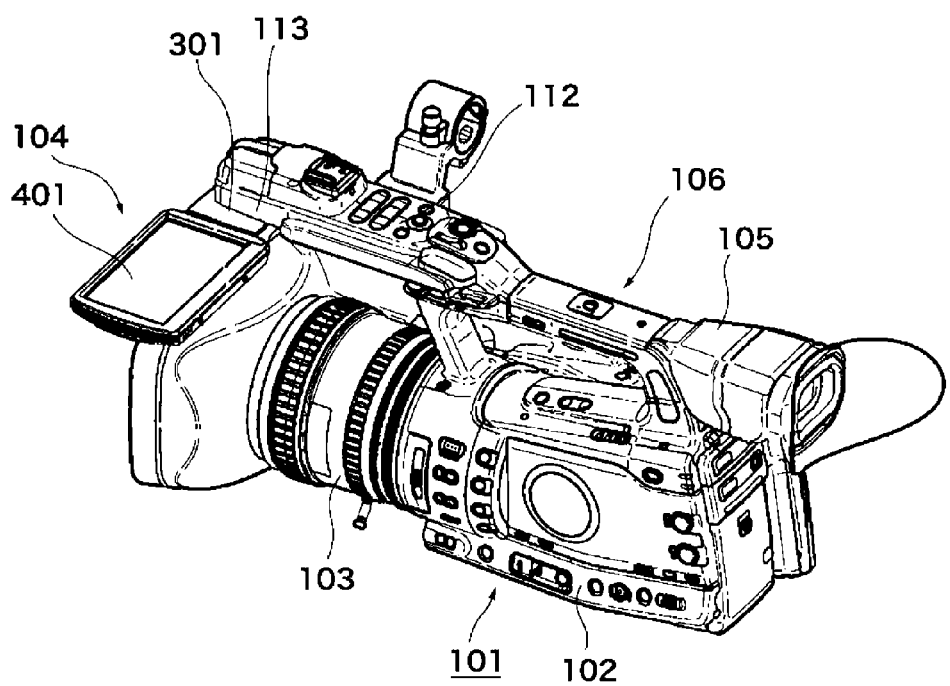
FIG. 4 is a perspective view showing the digital video camera shown in FIG. 1 when the display unit of the digital video camera is rotated in the left (L) direction viewed from the rear side of the camera body from a retracted position.
Figure 5:
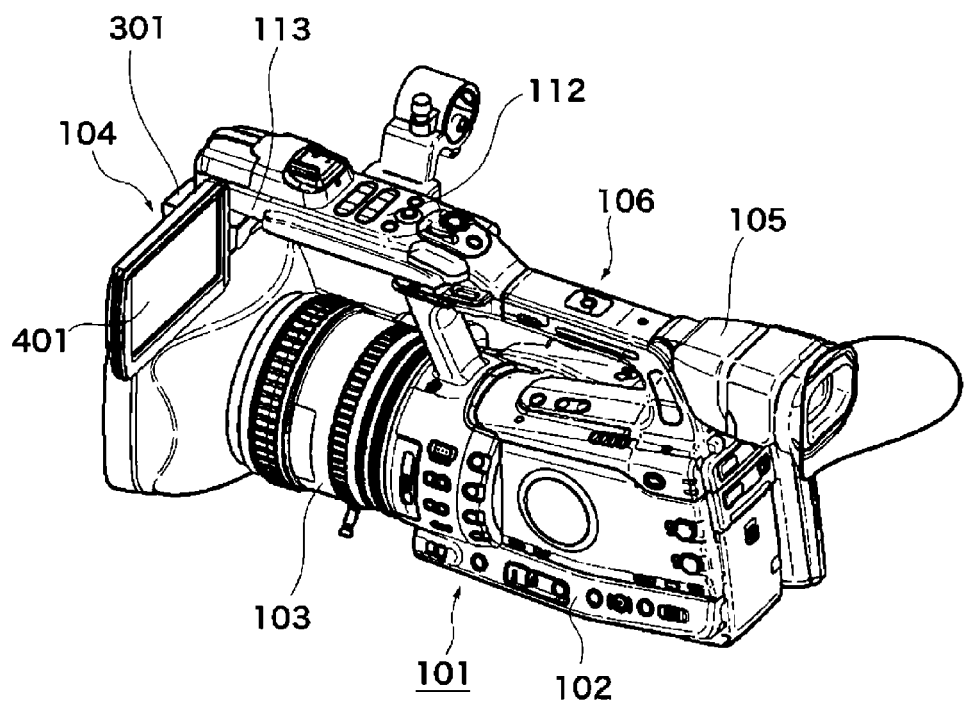
FIG. 5 is a perspective view showing the digital video camera when the display unit is rotated about 90 degrees so that the screen turns backward from the state shown in FIG. 4.

Then, when the display unit 104 is rotated about 90 degrees so that the screen 401 turns backward from the state shown in FIG. 4, the digital video camera 101 will be in a regular shooting state shown in FIG. 5.

Figure 10:
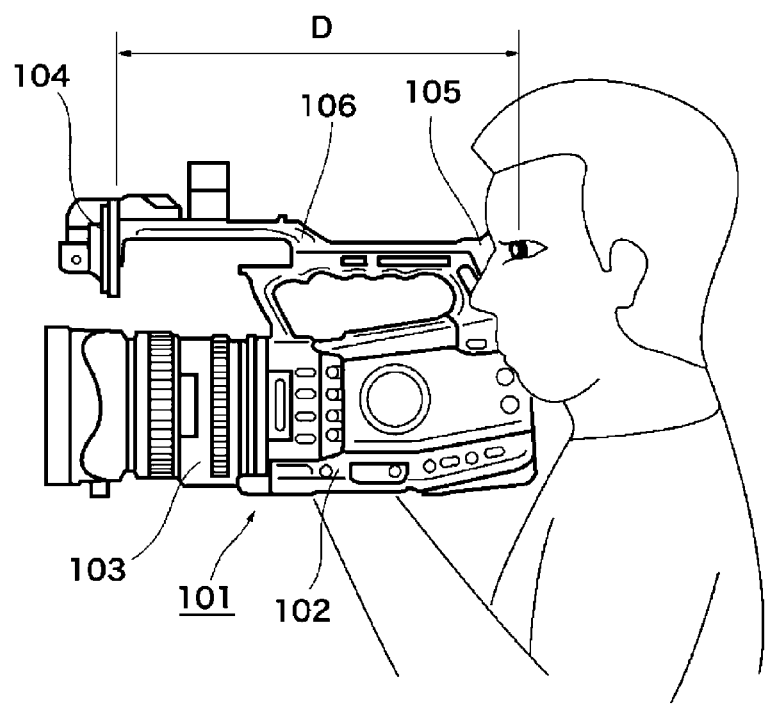
FIG. 10 is a schematic view showing the digital video camera shown in FIG. 1 that is held by a shooter so that the screen of the display unit meets eye level.

In this state, when a shooter grasps the camera body 102 so that his or her cheek contacts to the electronic view finder 105 as shown in FIG. 10, for example, a distance D from an eye of the shooter to the screen 401 of the display unit 104 can be kept optimally, which allows the shooter to shoot while grasping the camera body 102 with an easy position.

In this state, since the screen 401 of the display unit 104 can be arranged on an eyeline of the shooter who looks at a subject, the shooter can check the screen 401 visually without diverting the eyeline largely.

Figure 6:
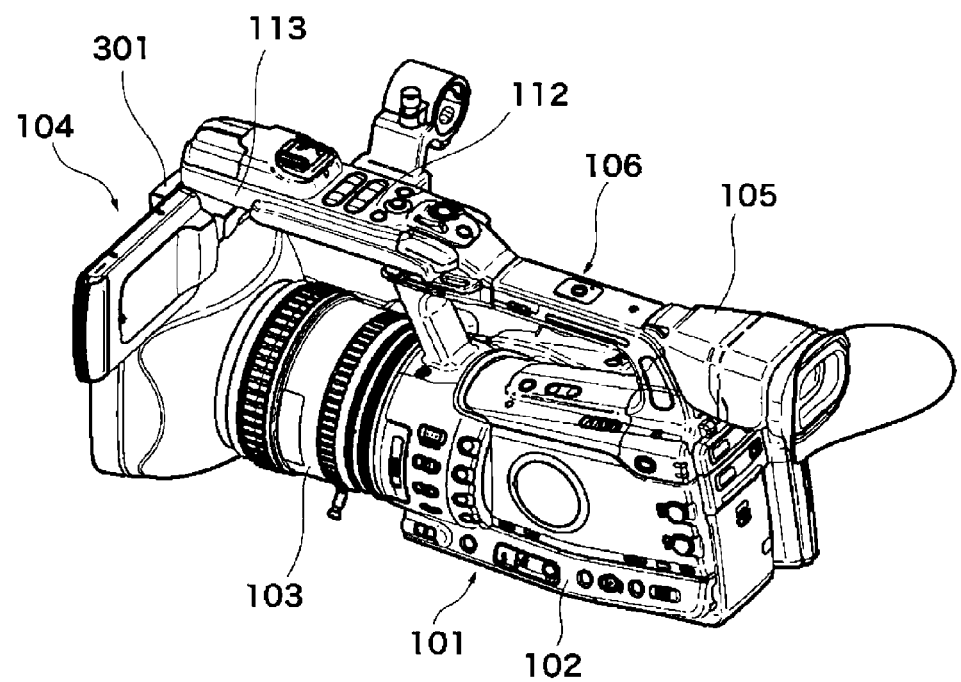
FIG. 6 is a perspective view showing the digital video camera when the display unit is rotated about 90 degrees so that the screen turns frontward from the state shown in FIG. 4.

When the display unit 104 is rotated about 90 degrees so that the screen 401 turns frontward from the state shown in FIG. 4, the digital video camera 101 will be in a state where the shooter can shoot while viewing one's own image as shown in FIG. 6.

In this embodiment, a display orientation where an erect image is displayed on the screen 401 of the display unit 104 in the state shown in FIG. 5 is defined as a first display orientation, and a display orientation where an erect image is displayed on the screen 401 of the display unit 104 in the state shown in FIG. 6 is defined as a second display orientation.

Figure 7:
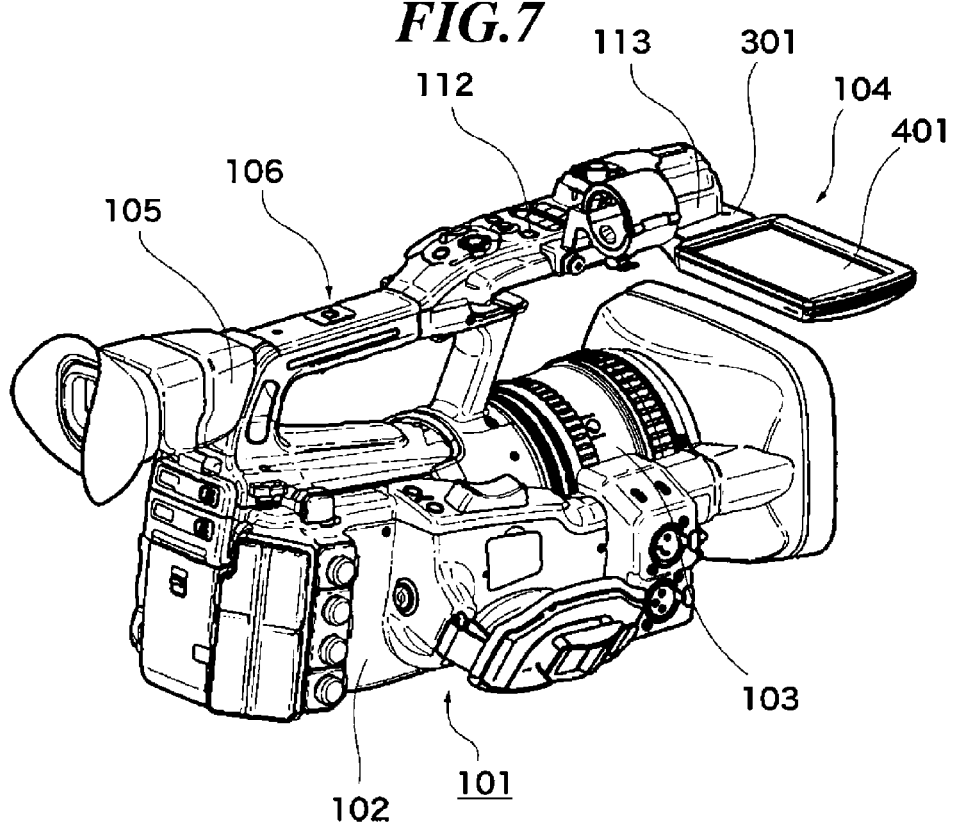
FIG. 7 is a perspective view showing the digital video camera shown in FIG. 1 when the display unit of the digital video camera is rotated in the right (R) direction viewed from the rear side of the camera body from a retracted position.

On the other hand, when the display unit 104 is rotated in the right (R) direction viewed from the rear side of the camera body 102 via the first axis 303 from the retracted position, the display unit 104 will be in a state shown in FIG. 7.

Figure 8:
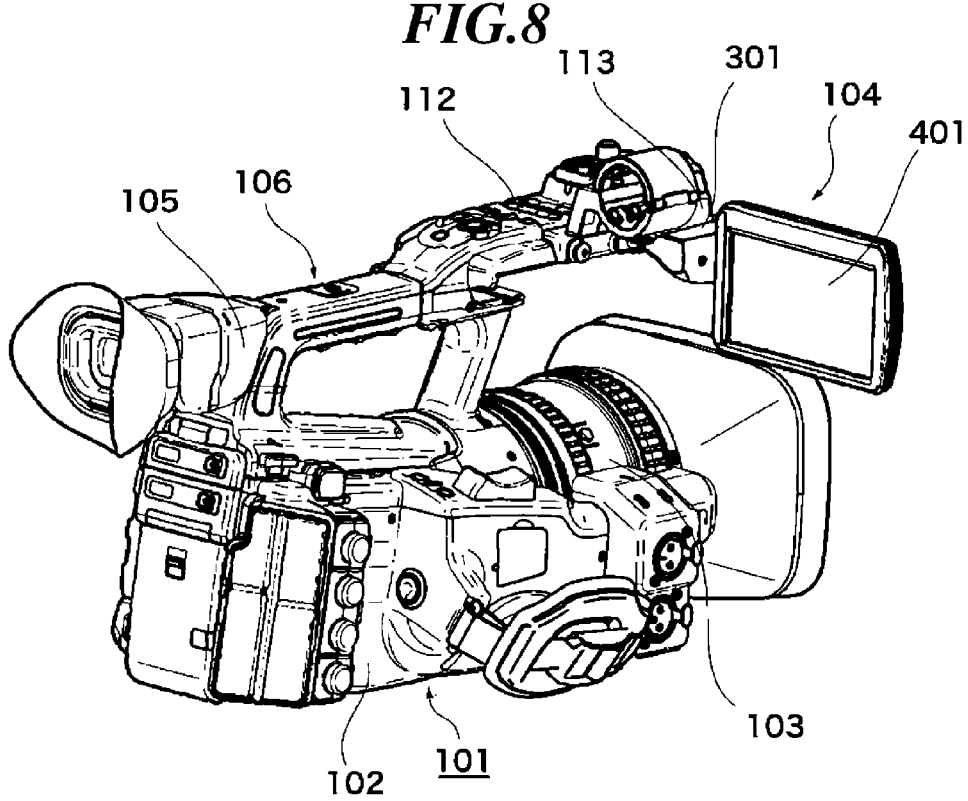
FIG. 8 is a perspective view showing the digital video camera when the display unit is rotated about 90 degrees so that the screen turns backward from the state shown in FIG. 7.

Then, when the display unit 104 is rotated about 90 degrees so that the screen 401 turns backward from the state shown in FIG. 7, the digital video camera 101 will be in a regular shooting state shown in FIG. 8. When the display unit 104 is rotated about 90 degrees so that the screen 401 turns frontward from the state shown in FIG. 7, the digital video camera 101 will be in a state where the shooter can shoot while viewing one's own image as shown in FIG. 9.

Figure 9:
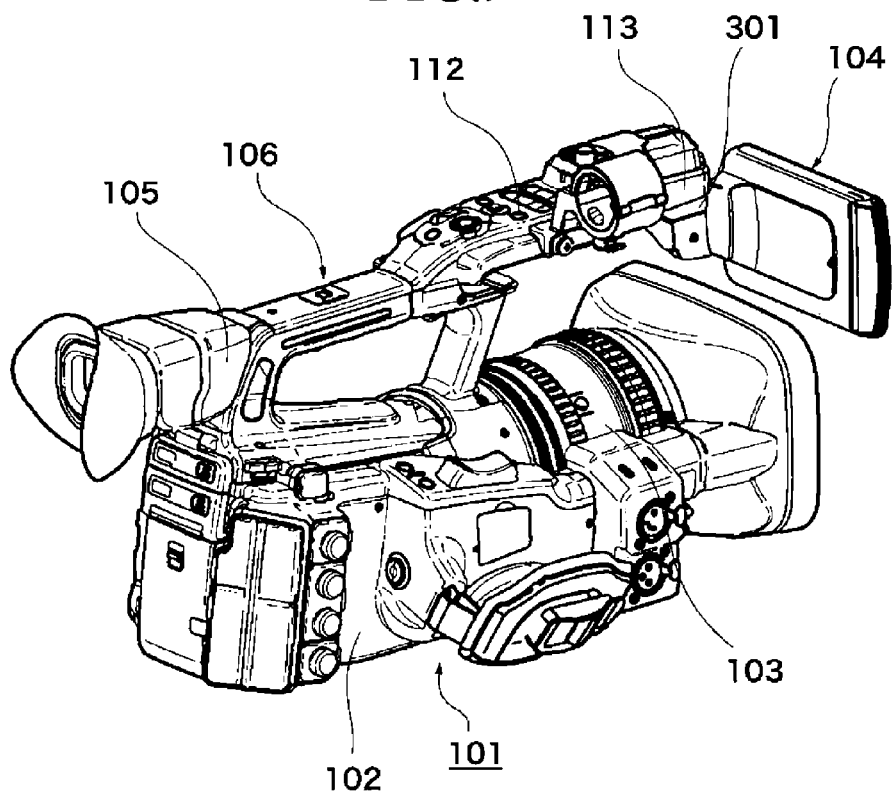
FIG. 9 is a perspective view showing the digital video camera when the display unit is rotated about 90 degrees so that the screen turns frontward from the state shown in FIG. 7.

The display orientation where an erect image is displayed on the screen 401 of the display unit 104 in the state shown in FIG. 8 is the second display orientation, and the display orientation where an erect image is displayed on the screen 401 of the display unit 104 in the state shown in FIG. 9 is the first display orientation. That is, the display orientation of the image in the states shown in FIG. 8 and FIG. 9 is upside down as compared with that in the states shown in FIG. 5 and FIG. 6.

As shown in FIG. 3, a printed circuit board 314 is fixed to the rotary member 306 with screws. First and second rotation detection switches 310 and 311 as a first axial rotation detector that detects rotation by the first bearing 308, and, third and fourth rotation detection switches 312 and 313 as a second axial rotation detector that detects rotation by the second bearing 309 are mounted on the printed circuit board 314.

Figure 11:
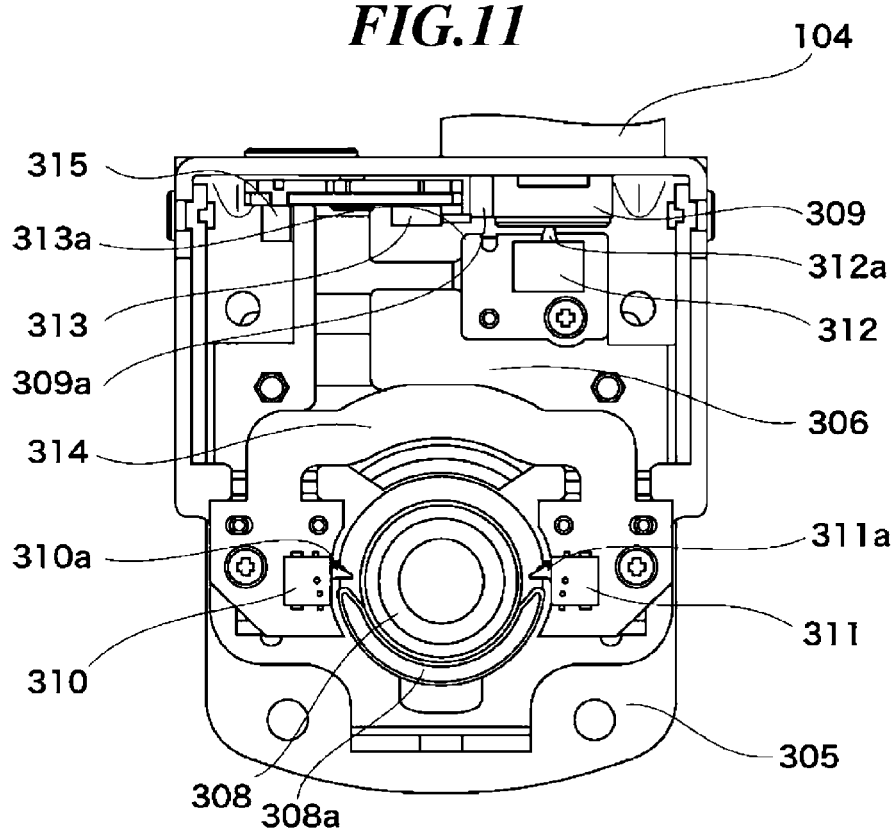
FIG. 11 is an enlarged plan view showing the two-axis hinge viewed from the underside of the camera body in a state where the display unit of the digital video camera shown in FIG. 1 is in the retracted position.

In this embodiment, the rotation direction of the first bearing 308 of the display unit 104 around the first axis 303 is detected using the first and second rotation detection switches 310 and 311, the rotation direction of the second bearing 309 of the display unit 104 around the second axis 304 is detected using the third and fourth rotation detection switches 312 and 313. FIG. 11 is an enlarged plan view showing the two-axis hinge 301 viewed from the underside of the camera body 102 in a state where the display unit 104 is in the retracted position.

As shown in FIG. 11, when the display unit 104 is in the retracted position, the first and second rotation detection switches 310 and 311 are arranged at positions mutually separated at an angle of 180 degrees in the horizontal direction viewed from the subject side, and moving elements 310a and 311a thereof face against the peripheral part of the first bearing 308.

An arc member 308a is fixed to the peripheral surface at the subject side (the lower side in FIG. 11) of the first bearing 308. The both ends of the arc member 308a in the circumferential direction are positioned close to the moving elements 310a and 311a, respectively.

At this time, the moving elements 310a and 311a of the first and second rotation detection switches 310 and 311 do not contact with the arc member 308a, and the first and second rotation detection switches 310 and 311 are in an ON state.

Each of the moving elements 310a and 311a is displaced in response to a load, and when displacement exceeds a fixed quantity, the electric characteristic varies. When the load applied to the moving element 310a (311a) is removed, the moving element 310a (311a) return to the position before receiving the load, and the electric characteristic varies again. Each of the first and second rotation detection switches 310 and 311 is an action type detection switch that detects the rotation direction of the display unit 104 using the variation of the electric characteristic.

Each of the third and fourth rotation detection switches 312 and 313 is also an action type detection switch similar to the first rotation detection switch 310. The third and fourth rotation detection switches 312 and 313 have moving elements 312a and 313a, respectively, and detect the rotation state of the display unit 104 using variations of the electric characteristics of the moving elements 312a and 313a due to the displacements.

Figure 12:
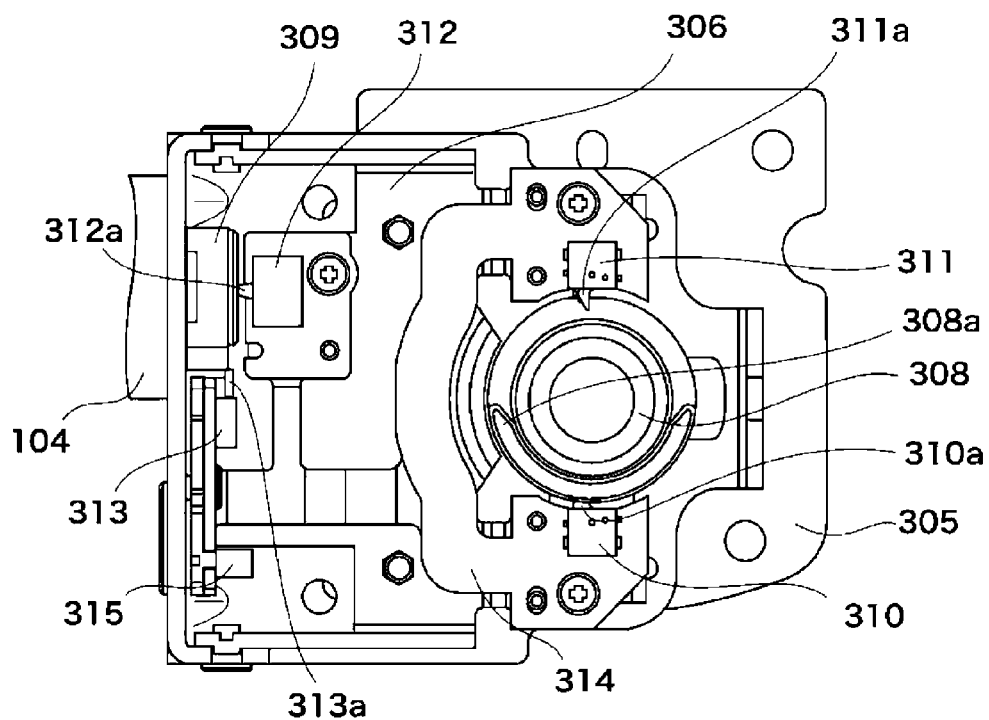
FIG. 12 is an enlarged plan view showing the two-axis hinge viewed from the underside of the camera body in a state where the display unit of the digital video camera shown in FIG. 1 is rotated about 90 degrees in the left (L) direction viewed from the rear side of the camera body from the retracted position.

FIG. 12 is an enlarged plan view showing the two-axis hinge 301 viewed from the underside of the camera body 102 in a state where the display unit 104 is rotated about 90 degrees in the left (L) direction viewed from the rear side of the camera body 102 from the retracted position.

In the state shown in FIG. 12, since the moving element 310a of the first rotation detection switch 310 overcomes the end of the arc member 308a in the circumferential direction, and is depressed and displaced by the peripheral part of the arc member 308a, the first rotation detection switch 310 is in an OFF state.

Figure 13:
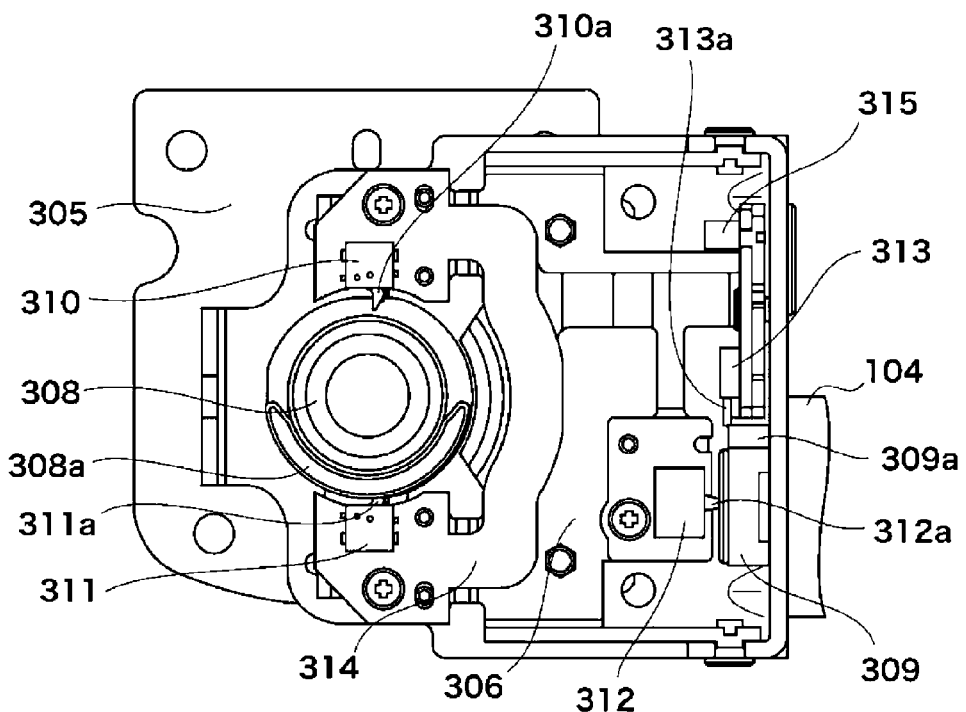
FIG. 13 is an enlarged plan view showing the two-axis hinge viewed from the underside of the camera body in a state where the display unit of the digital video camera shown in FIG. 1 is rotated about 90 degrees in the right (R) direction viewed from the rear side of the camera body from the retracted position.

FIG. 13 is an enlarged plan view showing the two-axis hinge 301 viewed from the underside of the camera body 102 in a state where the display unit 104 is rotated about 90 degrees in the right (R) direction viewed from the rear side of the camera body 102 from the retracted position.

In the state shown in FIG. 13, since the moving element 311a of the second rotation detection switch 311 overcomes the end of the arc member 308a in the circumferential direction, and is depressed and displaced by the peripheral part of the arc member 308a, the second rotation detection switch 311 is in the OFF state.

Figure 14:
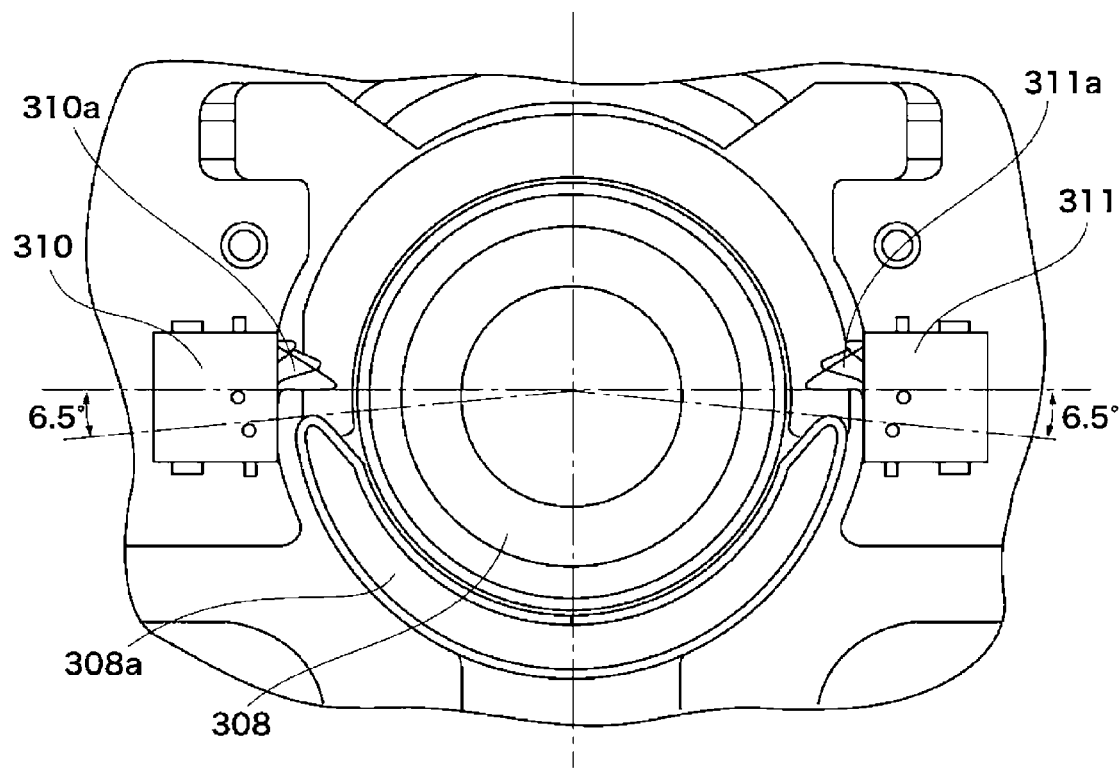
FIG. 14 is a partial enlarged view of FIG. 11.

FIG. 14 is a partial enlarged view of FIG. 11. When the display unit 104 is rotated 6.5 degrees in the right (R) direction from the retracted position, the moving element 310a of the first rotation detection switch 310 contacts with the circumferential end of the arc member 308a in this embodiment as shown in FIG. 14. When the display unit 104 is rotated about 10 degrees in the right (R) direction, the moving element 310a is depressed and the first rotation detection switch 310 turns OFF from ON. Similarly, when the display unit 104 is rotated 6.5 degrees in the left (L) direction from the retracted position, the moving element 311a of the second rotation detection switch 311 contacts with the circumferential end of the arc member 308a. When the display unit 104 is rotated about 10 degrees in the left (L) direction, the moving element 310a is depressed and the second rotation detection switch 311 turns OFF from ON.

Figure 15:
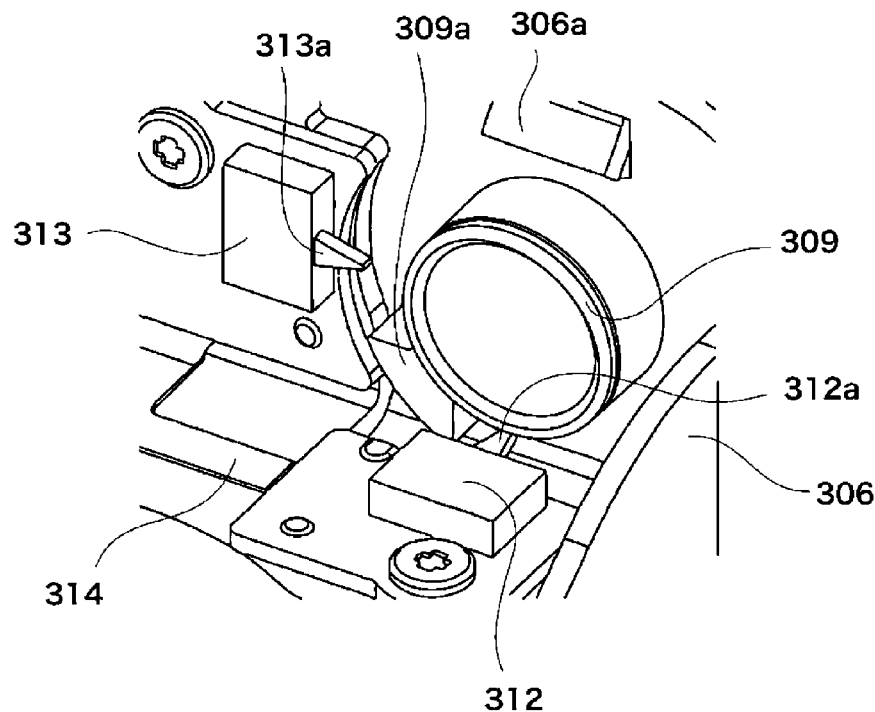
FIG. 15 is an enlarged perspective view showing the two-axis hinge viewed in an axial direction of a second bearing in the state (FIG. 1, FIG. 4, and FIG. 7) where the screen of the display unit of the digital video camera shown in FIG. 1 turns upward.

FIG. 15 is an enlarged perspective view showing the two-axis hinge 301 viewed in an axial direction of the second bearing 309 in the state (FIG. 1, FIG. 4, and FIG. 7) where the screen 401 of the display unit 104 turns upward.

As shown in FIG. 15, the third and fourth rotation detection switches 312 and 313 are arranged with a sector projection 309a provided in the peripheral part of the second bearing 309 between them in the circumferential direction.

The moving element 312a of the third rotation detection switch 312 extends along the peripheral part of the second bearing 309 in parallel with the second axis 304 of the second bearing 309, and can be displaced in the circumferential direction of the second bearing 309. A front edge of the moving element 313a of the fourth rotation detection switch 313 faces to the peripheral part of the second bearing 309, and can be displaced in the circumferential direction of the second bearing 309.

When the display unit 104 is rotated frontward (the direction of arrow F in FIG. 3 and FIG. 16) from the state where the display unit 104 has been rotated in the left direction viewed from the rear side as shown in FIG. 4 to the state where the screen 401 is directed to the subject side as shown in FIG. 6, the projection 309a pushes the moving element 313a, which turns ON the fourth rotation detection switch 313.

When the display unit 104 is rotated frontward (the direction of arrow B in FIG. 3 and FIG. 16) from the state where the display unit 104 has been rotated in the right direction viewed from the rear side as shown in FIG. 7 to the state where the screen 401 is directed to the subject side as shown in FIG. 9, the projection 309a pushes the moving element 312a, which turns ON the third rotation detection switch 312.

Figure 16:
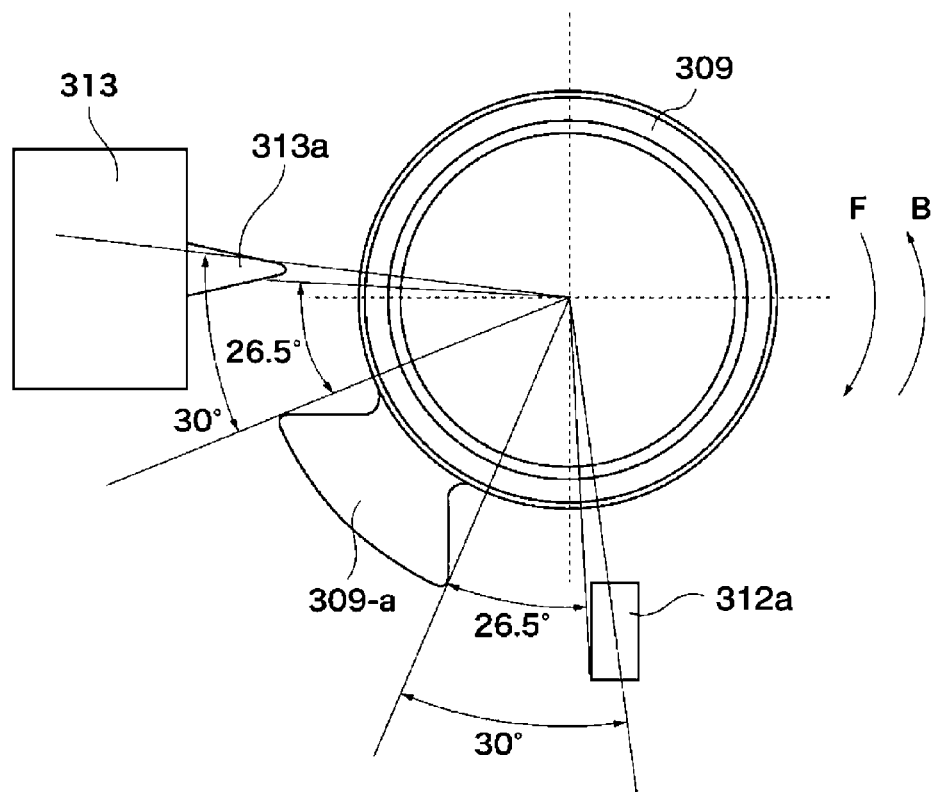
FIG. 16 is a view showing positional relationship between a projection and moving elements of rotation detection switches that are shown in FIG. 15.

FIG. 16 is a view showing positional relationship between the projection 309a and the moving elements 312a and 313a of the third and fourth rotation detection switches 312 and 313.

As shown in FIG. 16, the display unit 104 is rotated 26.5 degrees from the state shown in FIG. 4 in the direction of arrow F, the projection 309a contacts with the moving element 313a of the fourth rotation detection switch 313. When the display unit 104 is rotated 30 degrees in the direction of arrow F, the fourth rotation detection switch 313 turns ON.

At this time, the rotation of the display unit 104 toward the subject side is detected, and the display orientation of the image displayed on the screen 401 of the display unit 104 is switched from the first display orientation to the second display orientation.

On the other hand, when the display unit 104 is rotated 26.5 degrees from the state in FIG. 7 in the direction of arrow B, the projection 309a contacts with the moving element 312a of the third rotation detection switch 312. When the display unit 104 is rotated 30 degrees in the direction of arrow B, the third rotation detection switch 312 turns ON.

At this time, the rotation of the display unit 104 toward the subject side is detected, and the display orientation of the image displayed on the screen 401 of the display unit 104 is switched from the second display orientation to the first display orientation.

Figure 17:
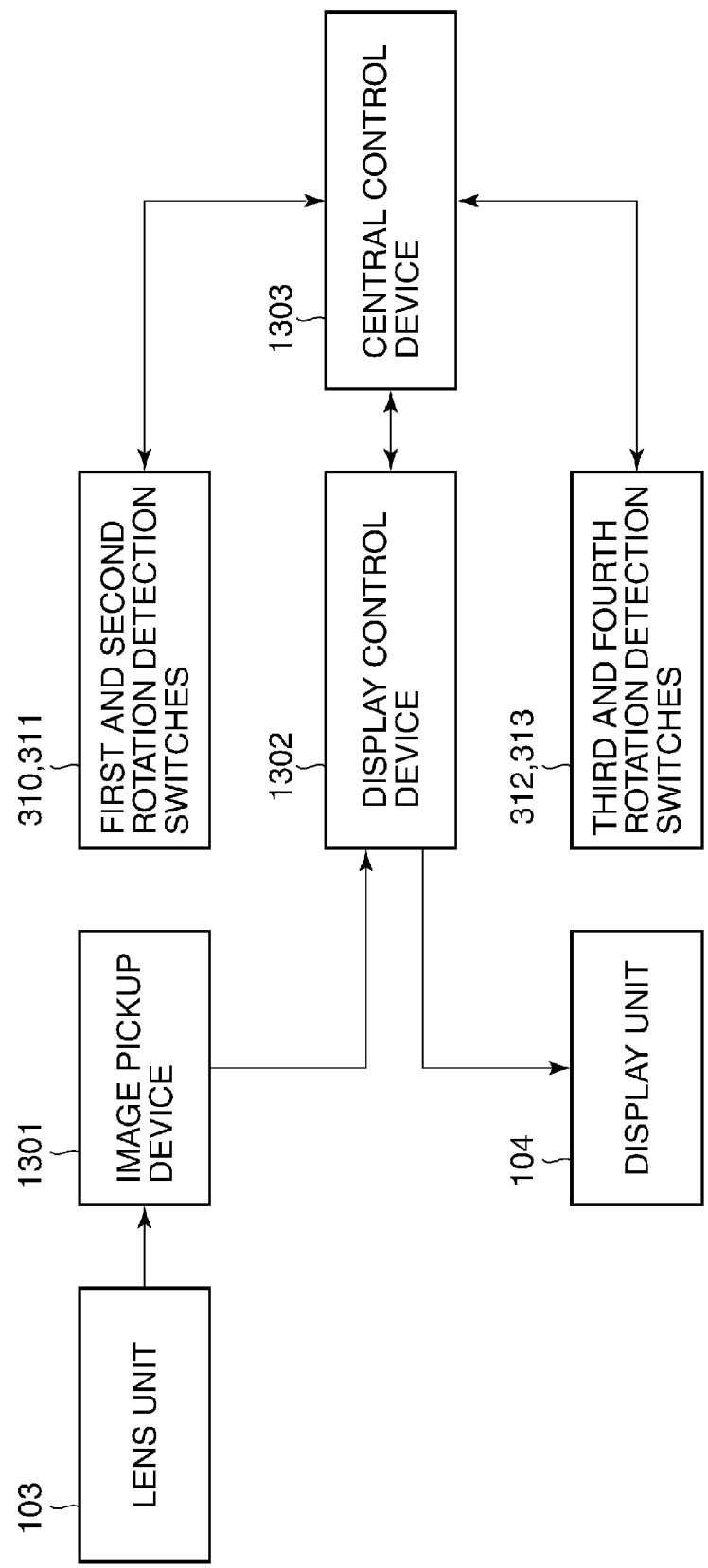
FIG. 17 is a block diagram schematically showing an example of a control system that switches a display orientation of an image displayed on the screen of the display unit of the digital video camera shown in FIG. 1.

FIG. 17 is a block diagram schematically showing an example of a control system that switches the display orientation of the image displayed on the screen 401 of the display unit 104.

In FIG. 17, a subject image formed on an image pickup device 1301 through the lens unit 103 is converted (photoelectric conversion) by the image pickup device 1301. Then, a display control apparatus 1302 applies a predetermined image process to the converted image signal, and the converted image signal is displayed on the screen 401 of the display unit 104 as an image.

A central control device 1303 acquires detection signals from the first and second rotation detection switches 310 and 311 and the third and fourth rotation detection switches 312 and 313. Then, a display control device 1302 performs a switching control of the display orientation of the image displayed on the screen 401 of the display unit 104 based on instructions from the central control device 1303.

Figure 18:
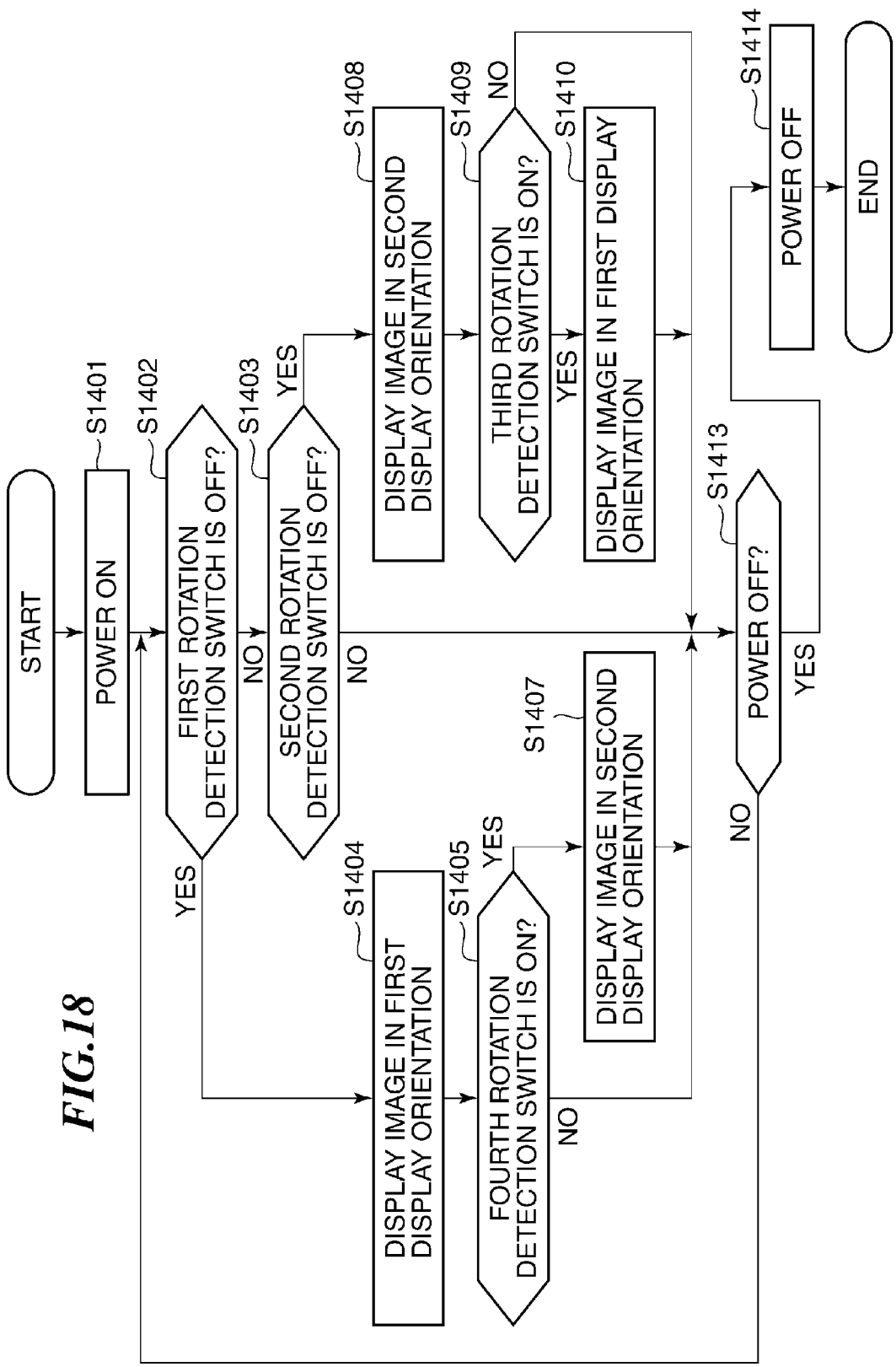
FIG. 18 is a flowchart showing an example of a display orientation switching process for an image displayed on the screen of the display unit of the digital video camera shown in FIG. 1.

FIG. 18 is a flowchart showing an example of a display orientation switching process for an image displayed on the screen 401 of the display unit 104.

In FIG. 18, when a power switch turns ON in step S1401, the central control device 1303 proceeds with the process to step S1402.

In the step S1402, the central control device 1303 determines whether the first rotation detection switch 310 is OFF. When the first rotation detection switch 310 is OFF, the central control device 1303 determines that the display unit 104 is rotated leftward from the retracted position viewed from the rear side of the camera body, and proceeds with the process to step S1404. When the first rotation detection switch 310 is ON, the central control device 1303 proceeds with the process to step S1403.

In the step S1403, the central control device 1303 determines whether the second rotation detection switch 311 is OFF.

When the second rotation detection switch 311 is OFF, the central control device 1303 determines that the display unit 104 is rotated rightward from the retracted position viewed from the rear side of the camera body, and proceeds with the process to step S1408. When the second rotation detection switch 311 is ON, the central control device 1303 proceeds with the process to step S1413.

In the step S1404, the central control device 1303 controls the display control device 1302 to display an image on the screen 401 of the display unit 104 in the first display orientation, and proceeds with the process to step S1405. Accordingly, when the screen 401 of the display unit 104 is turned upward as shown in FIG. 4, and when the screen 401 is turned backward as shown in FIG. 5, an erect image is displayed on the screen 401.

In the step S1405, the central control device 1303 determines whether the fourth rotation detection switch 313 is ON.

When the fourth rotation detection switch 313 is ON, the central control device 1303 determines that the display unit 104 is rotated in the direction to turn the screen 401 toward the subject side, and proceeds with the process to step S1407. When the fourth rotation detection switch 313 is OFF, the process proceeds to the step S1403.

In the step S1407, the central control device 1303 controls the display control device 1302 to display an image on the screen 401 of the display unit 104 in the second display orientation, and proceeds with the process to step S1413. Accordingly, when the display unit 104 is rotated so that the screen 401 is directed frontward as shown in FIG. 6, an erect image is displayed on the screen 401.

On the other hand, in the step S1408, the central control device 1303 controls the display control device 1302 to display an image on the screen 401 of the display unit 104 in the second display orientation, and proceeds with the process to step S1409. Accordingly, when the screen 401 of the display unit 104 is turned upward as shown in FIG. 7, and when the screen 401 is turned backward as shown in FIG. 8, an erect image is displayed on the screen 401.

In the step S1409, the central control device 1303 determines whether the third rotation detection switch 312 is ON.

When the third rotation detection switch 312 is ON, the central control device 1303 determines that the display unit 104 is rotated in the direction to turn the screen 401 toward the subject side, and proceeds with the process to step S1410. When the third rotation detection switch 312 is OFF, the process proceeds to the step S1413.

In the step S1410, the central control device 1303 controls the display control device 1302 to display an image on the screen 401 of the display unit 104 in the first display orientation, and proceeds with the process to the step S1413. Accordingly, when the display unit 104 is rotated so that the screen 401 is directed frontward as shown in FIG. 9, an erect image is displayed on the screen 401.

In the step S1413, the central control device 1303 determines whether the power switch turns OFF. When the power switch is OFF, the process proceeds to step S1414. When the power switch is not turned OFF, the process returns to the step S1402.

In the step S1414, the central control device 1303 turns OFF the power and finishes the process.

As described above, this embodiment can give the same rotary operation feeling to a shooter even when the display unit 104 rotates in either of right and left directions viewed from the rear side. Further, this embodiment can always display the erect image to a person who looks at the screen 401 even when the display unit 104 is rotated in either of right and left directions and when the screen 401 is directed either of frontward and backward.

Next, a digital video camera as an image pickup apparatus according to a second embodiment of the present invention will be described with reference to FIG. 19 through FIG. 26. It should be noted that duplicated sections or corresponding sections with respect to the above-mentioned first embodiment will be described by diverting the figures and the signs, and detailed description thereof will be omitted.

Figure 19:
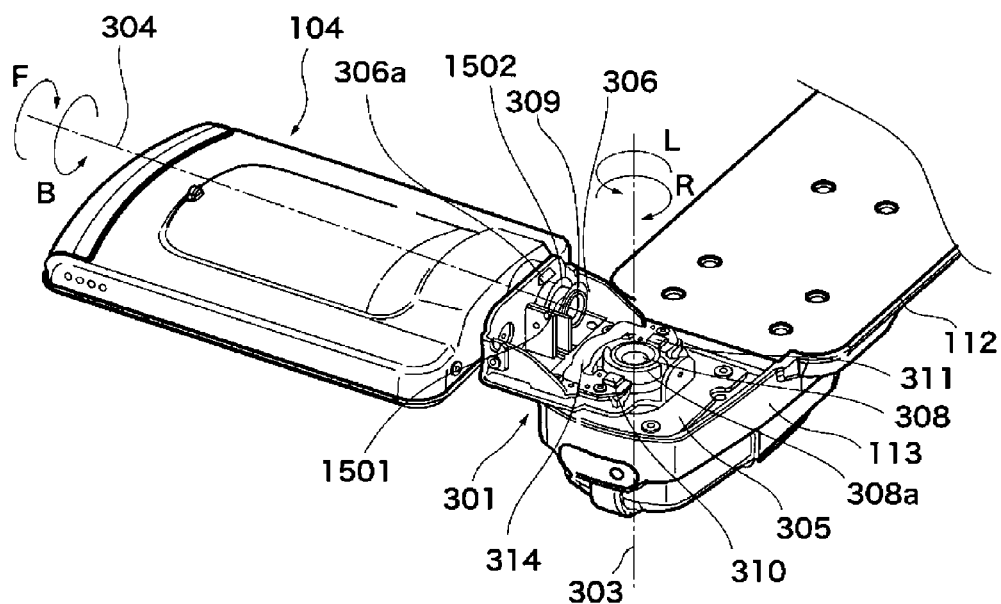
FIG. 19 is a perspective view showing a display unit, which is mounted on a projecting part located at a front side of a digital video camera as an image pickup apparatus according to a second embodiment of the present invention, and a two-axis hinge, which supports the display unit, viewed from an underside of the projecting part when the display unit is rotated in a left direction viewed from the rear side of the camera body.
Figure 20:
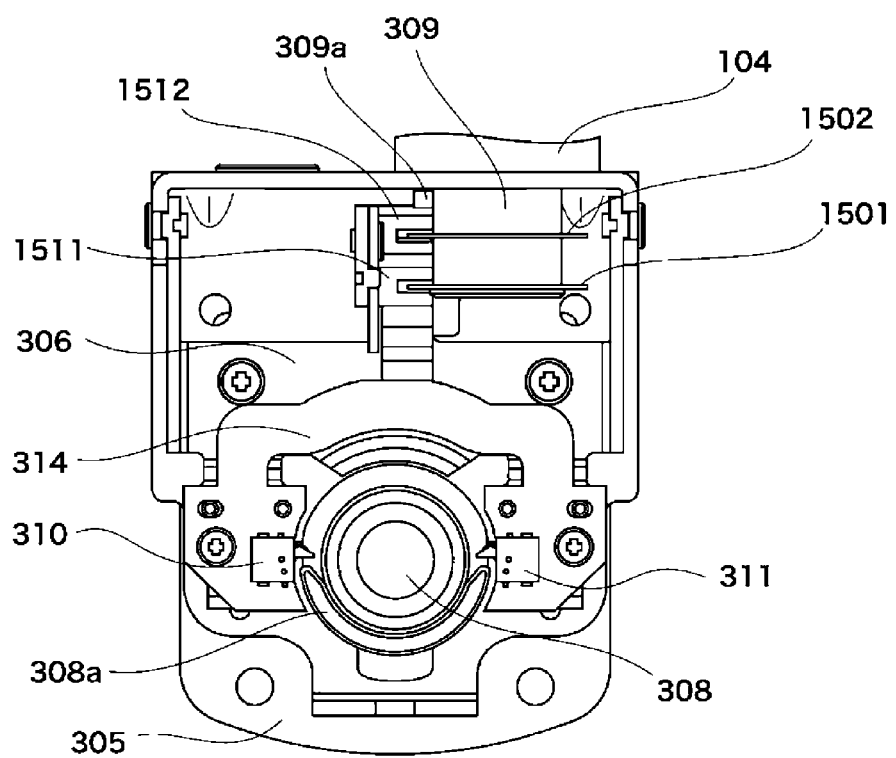
FIG. 20 is an enlarged plan view showing the two-axis hinge viewed from an underside of the projecting part in a state where the display unit shown in FIG. 19 is in the retracted position.

FIG. 19 is a perspective view showing the display unit 104 and the two-axis hinge 301 viewed from an underside of the projecting part 113 when the display unit 104 is rotated in the left direction viewed from the rear side of the camera body 102. FIG. 20 is an enlarged plan view showing the two-axis hinge 301 viewed from the underside of the projecting part 113 in a state where the display unit 104 is in the retracted position. It should be noted that FIG. 19 and FIG. 20 show the state where an armoring cover for the two-axis hinge 301 was detached.

As shown in FIG. 19 and FIG. 20, the digital video camera of this embodiment detects coloring sections 1603 and 1703 of first and second bright films 1502 and 1501 that rotate together with the second bearing 309 by first and second rotation detection sensors 1512 and 1511 that are mounted on the printed circuit board 314 as the second axial rotation detector for detecting rotation by the second bearing 309.

Then, the rotation state of the display unit 104 around the second axis 304 of the second bearing 309 is determined based on output signals from the first and second rotation detection sensors 1512 and 1511. In this embodiment, the first and second rotation detection sensors 1512 and 1511 are transmission type photosensors (photointerrupters etc.), the first and second bright films 1502 and 1501 are fixed to the peripheral part of the second bearing 309 so that they are separated to each other in the axial direction and are approximately concentric.

Figure 21:
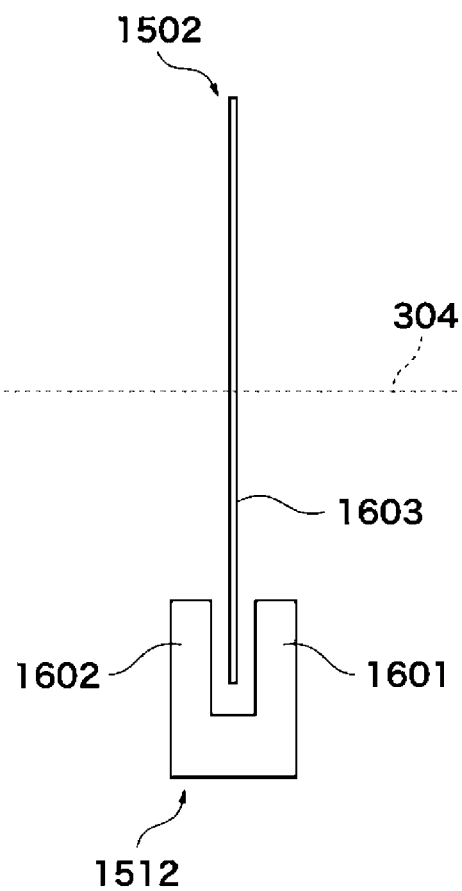
FIG. 21 is a side view showing a first rotation detecting sensor and a first bright film for detecting rotation of the display unit shown in FIG. 19 around a second axis.
Figure 22:
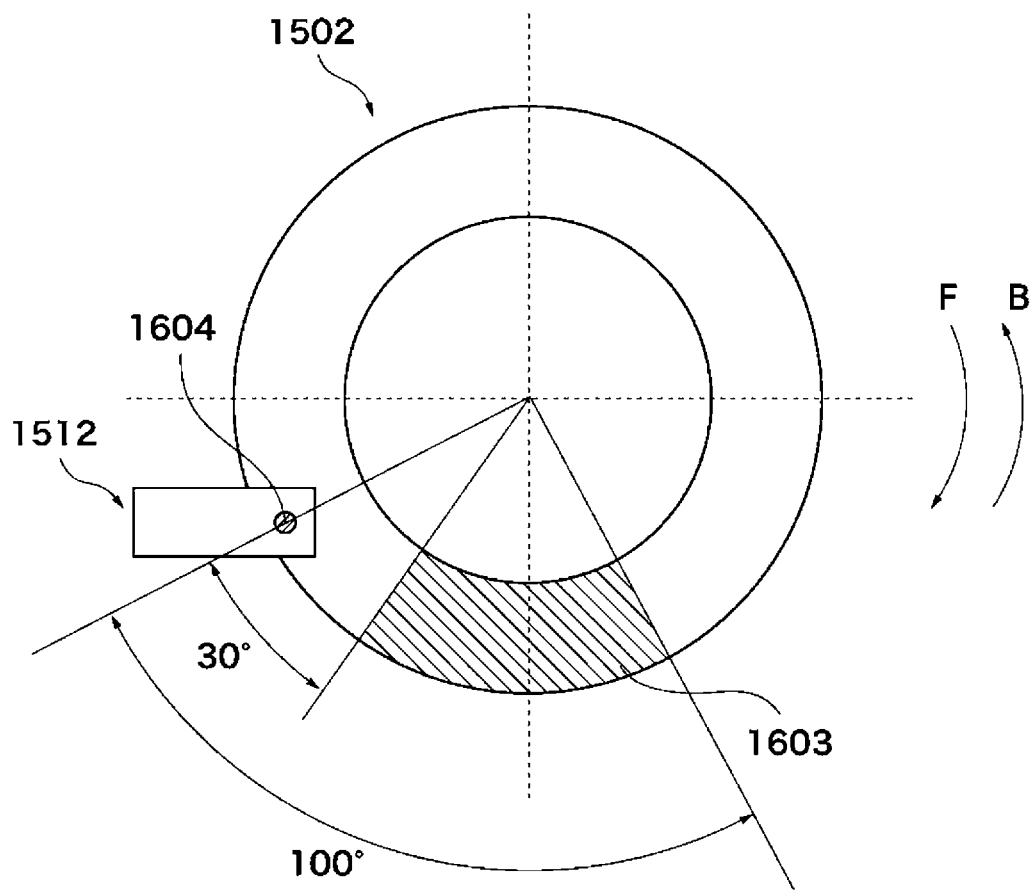
FIG. 22 is a front view of the first rotation detecting sensor and the first bright film viewed in an axial direction of the second axis in the state shown in FIG. 19.

FIG. 21 is a view showing the first rotation detection sensor 1512 and the first bright film 1502, and FIG. 22 is a view showing the first rotation detection sensor 1512 and the first bright film 1502 viewed in the direction of the second axis 304 in the state in FIG. 19.

As shown in FIG. 21 and FIG. 22, the first rotation detection sensor 1512 is provided with a light emitting section 1601, a light sensing section 1602, and a detection section 1604. The detection section 1604 measures amount of light that reaches the light sensing section 1602 among the light irradiated from the light emitting section 1601.

As shown in FIG. 22, the coloring section 1603 of the first bright film 1502 is colored black, for example. Then, when the coloring section 1603 passes through the detection section 1604 of the first rotation detection sensor 1512 while the first bright film 1502 rotates with the rotation of the second bearing 309 in the direction of arrow F, the amount of light received by the light sensing section 1602 varies, and the first rotation detection sensor 1512 outputs an ON signal.

The coloring section 1603 is arranged within a range of 70 degrees from 30 degrees to 100 degrees in the direction of arrow B with reference to the detection section 1604 in the state where the display unit 104 is in the retracted position. The display unit 104 can rotate 90 degrees in the direction of arrow F from the retracted position. The range from 90 degrees to 100 degrees of the coloring section 1603 is a margin to avoid detecting the bright section of the first bright film 1603 due to misalignment of the coloring section 1603 before the rotation angle of the display unit 104 reaches 90 degrees.

Figure 23:
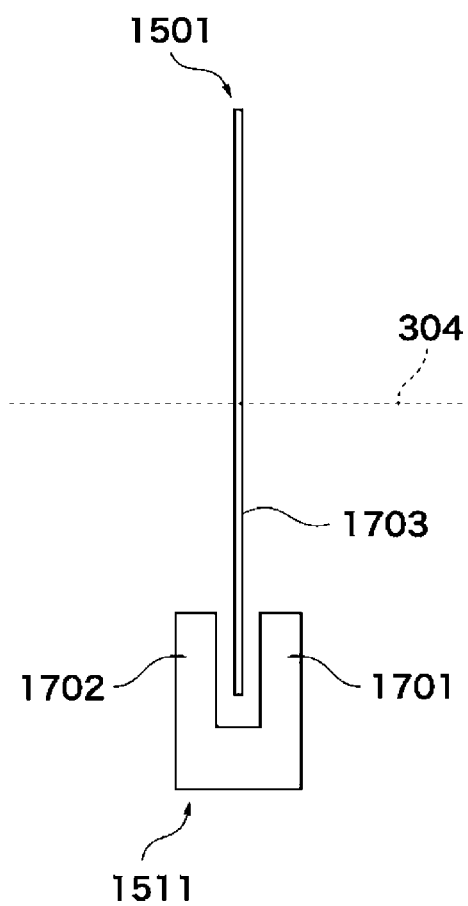
FIG. 23 is a side view showing a second rotation detecting sensor and a second bright film for detecting rotation of the display unit shown in FIG. 19 around the second axis.
Figure 24:
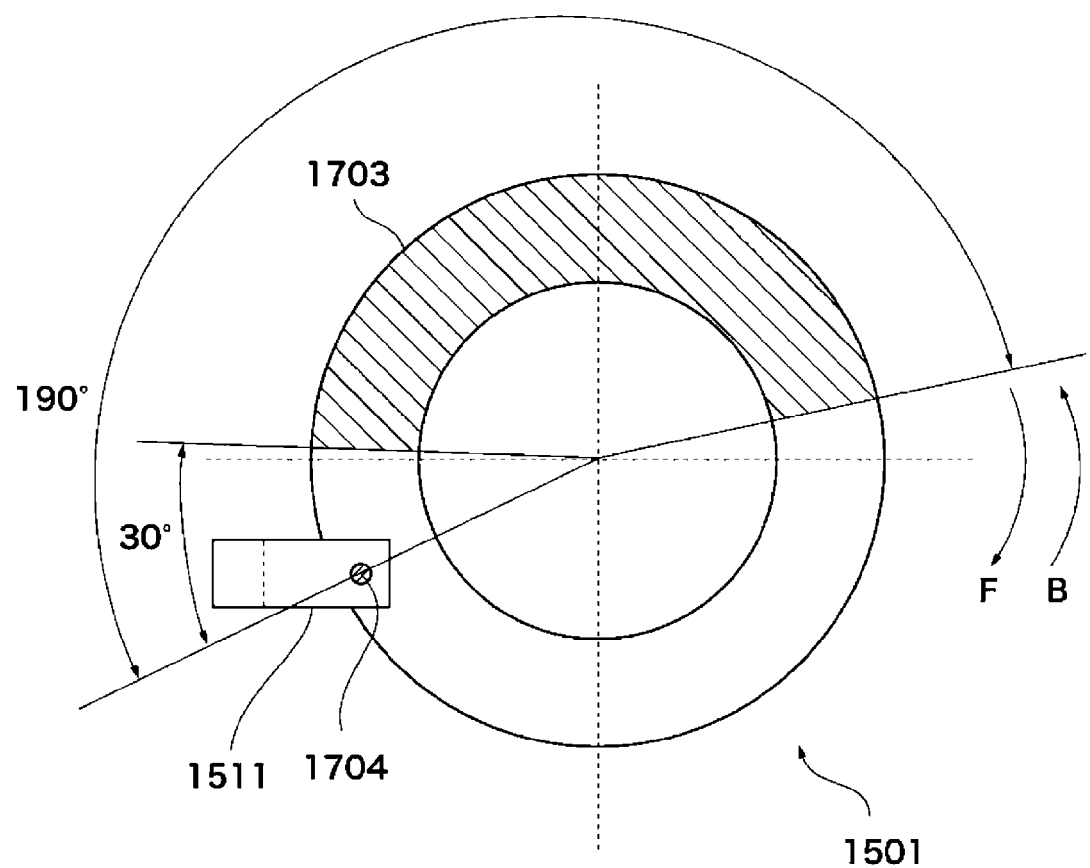
FIG. 24 is a front view of the second rotation detecting sensors and the second bright film viewed in the axial direction of the second axis in the state shown in FIG. 19.

FIG. 23 is a view showing the second rotation detection sensor 1511 and the second bright film 1501, and FIG. 24 is a view showing the second rotation detection sensor 1511 and the second bright film 1501 viewed in the direction of the second axis 304 in the state in FIG. 19.

As shown in FIG. 23 and FIG. 24, the second rotation detection sensor 1511 is provided with a light emitting section 1701, a light sensing section 1702, and a detection section 1704. The detection section 1704 measures amount of light that reaches the light sensing section 1702 among the light irradiated from the light emitting section 1701.

As shown in FIG. 24, the coloring section 1703 of the second bright film 1501 is colored black as with the coloring section 1603. Then, when the coloring section 1703 passes through the detection section 1704 of the second rotation detection sensor 1511 while the second bright film 1501 rotates with the rotation of the second bearing 309 in the direction of arrow B, the amount of light received by the light sensing section 1702 varies, and the second rotation detection sensor 1511 outputs an ON signal.

The coloring section 1703 is arranged within a range of 130 degrees from 30 degrees to 190 degrees in the direction of arrow F with reference to the detection section 1704 in the state where the display unit 104 is in the retracted position. The display unit 104 can rotate 180 degrees in the direction of arrow B from the retracted position. The range from 180 degrees to 190 degrees of the coloring section 1703 is a margin to avoid detecting the bright section of the second bright film 1501 due to misalignment of the coloring section 1703 before the rotation angle of the display unit 104 reaches 180 degrees.

It should be noted that the rotation in the direction of arrow F turns the screen 401 to the subject side when the display unit 104 is rotated in the left direction viewed from the rear side of the camera body as shown in FIG. 4. On the other hand, the rotation in the direction of arrow B turns the screen 401 to the subject side when the display unit 104 is rotated in the right direction viewed from the rear side of the camera body as shown in FIG. 7.

Figure 25:
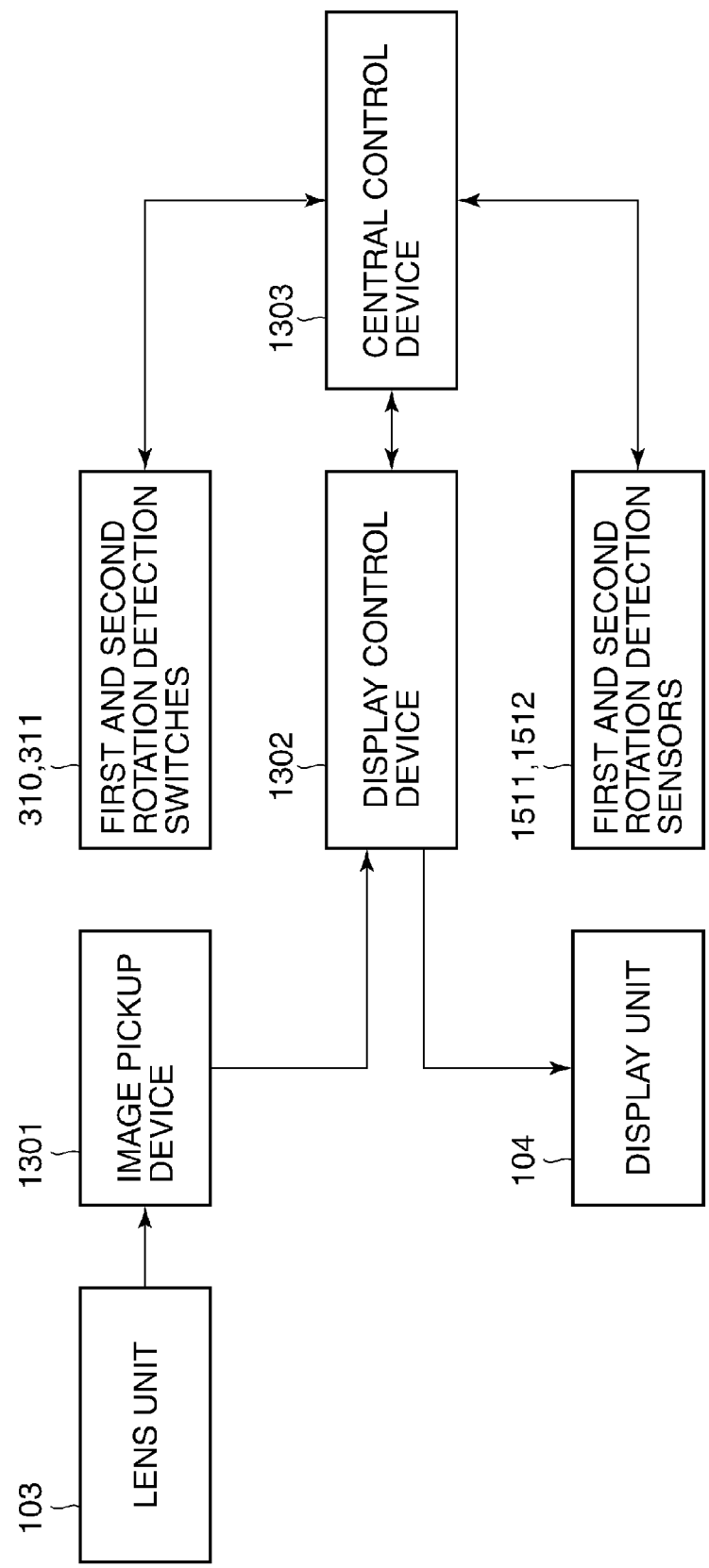
FIG. 25 is a block diagram schematically showing an example of a control system that switches a display orientation of an image displayed on the screen of the display unit of the digital video camera according to the second embodiment.

FIG. 25 is a block diagram schematically showing an example of a control system that switches the display orientation of the image displayed on the screen 401 of the display unit 104.

In FIG. 25, a subject image formed on an image pickup device 1301 through the lens unit 103 is converted (photoelectric conversion) by the image pickup device 1301. Then, a display control apparatus 1302 applies a predetermined image process to the converted image signal, and the converted image signal is displayed on the screen 401 of the display unit 104 as an image.

A central control device 1303 acquires detection signals from the first and second rotation detection switches 310 and 311 and the first and second rotation detection sensors 312 and 313. Then, a display control device 1302 performs a switching control of the display orientation of the image displayed on the screen 401 of the display unit 104 based on instructions from the central control device 1303.

Figure 26:
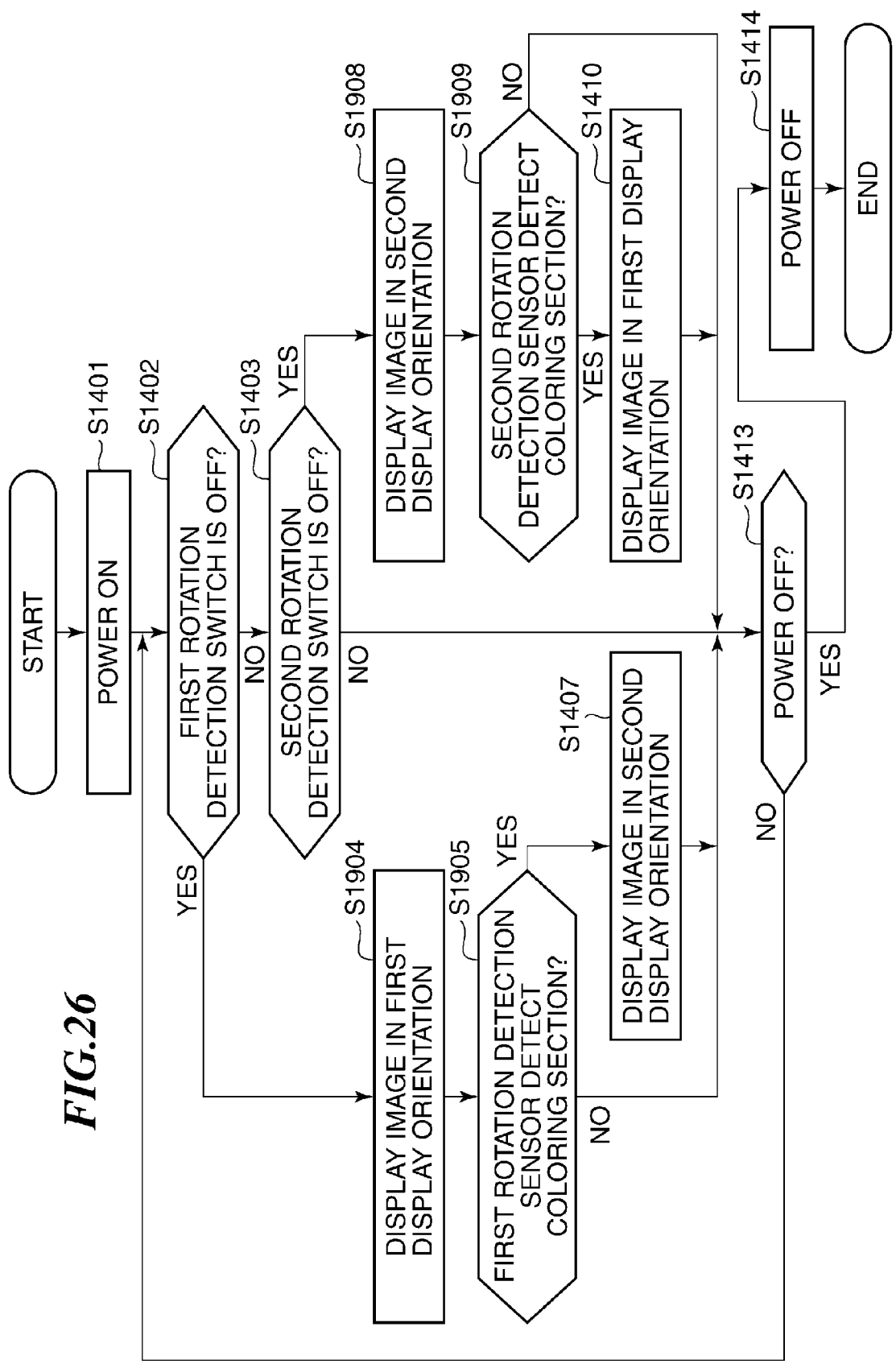
FIG. 26 is a flowchart showing an example of a display orientation switching process for an image displayed on the screen of the display unit of the digital video camera according to the second embodiment.

FIG. 26 is a flowchart showing an example of a display orientation switching process for an image displayed on the screen 401 of the display unit 104. It should be noted that since the steps S1401 through step S1403, S1407, S1410, S1413, and S1414 are the same as that of the first embodiment (FIG. 18) mentioned above, the descriptions are omitted.

In step S1904 in FIG. 26, the central control device 1303 controls the display control device 1302 to display an image on the screen 401 of the display unit 104 in the first display orientation, and proceeds with the process to step S1905. Accordingly, when the screen 401 of the display unit 104 is turned upward as shown in FIG. 4, and when the screen 401 is turned backward as shown in FIG. 5, an erect image is displayed on the screen 401.

In the step S1905, the central control device 1303 determines whether the first rotation detection sensor 1512 turns ON by detecting the coloring section 1603.

When the first rotation detection sensor 1512 is ON, the central control device 1303 determines that the display unit 104 is rotated in the direction to turn the screen 401 toward the subject side, and proceeds with the process to step S1407. When the first rotation detection sensor 1512 is OFF, the process proceeds to the step S1413.

It should be noted that the central control device 1303 controls the display control device 1302 to display an image on the screen 401 of the display unit 104 in the second display orientation in the step S1408 as mentioned above, and proceeds with the process to step S1413. Accordingly, when the display unit 104 is rotated so that the screen 401 is directed frontward as shown in FIG. 6, an erect image is displayed on the screen 401.

On the other hand, in the step S1908, the central control device 1303 controls the display control device 1302 to display an image on the screen 401 of the display unit 104 in the second display orientation, and proceeds with the process to step S1909. Accordingly, when the screen 401 of the display unit 104 is turned upward as shown in FIG. 7, and when the screen 401 is turned backward as shown in FIG. 8, an erect image is displayed on the screen 401.

In the step S1905, the central control device 1303 determines whether the second rotation detection sensor 1511 turns ON by detecting the coloring section 1703.

When the second rotation detection sensor 1511 is ON, the central control device 1303 determines that the display unit 104 is rotated in the direction to turn the screen 401 toward the subject side, and proceeds with the process to step S1410. When the second rotation detection sensor 1511 is OFF, the process proceeds to the step S1413.

It should be noted that the central control device 1303 controls the display control device 1302 to display an image on the screen 401 of the display unit 104 in the first display orientation in the step S1410 as mentioned above, and proceeds with the process to step S1413. Accordingly, when the display unit 104 is rotated so that the screen 401 is directed frontward as shown in FIG. 9, an erect image is displayed on the screen 401. The other configurations and operation effects are the same as that of the above-mentioned first embodiment.

Next, a digital video camera as an image pickup apparatus according to a third embodiment of the present invention will be described with reference to FIG. 27 through FIG. 30. It should be noted that duplicated sections or corresponding sections with respect to the above-mentioned first embodiment will be described by diverting the figures and the signs, and detailed description thereof will be omitted.

Figure 27:
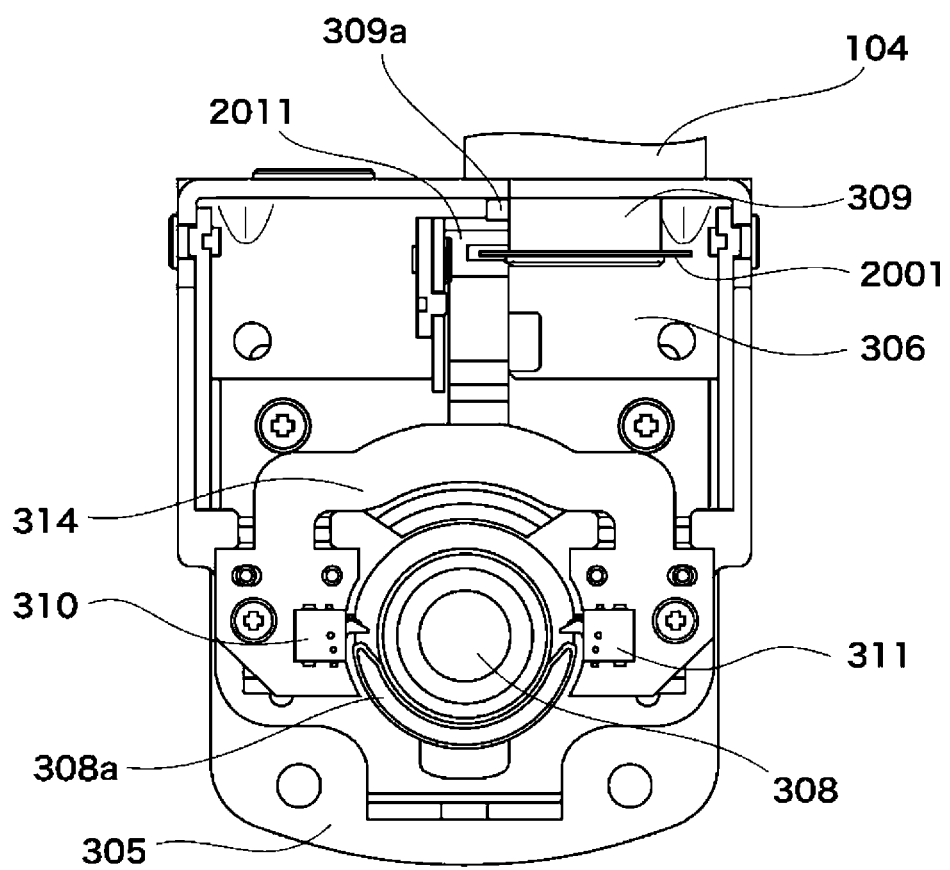
FIG. 27 is an enlarged plan view showing a two-axis hinge, which supports a display unit mounted on a projecting part located at a front side of a digital video camera as an image pickup apparatus according to a third embodiment of the present invention, in a state where the display unit is in the retracted position, viewed from an underside of the projecting part.
Figure 28:
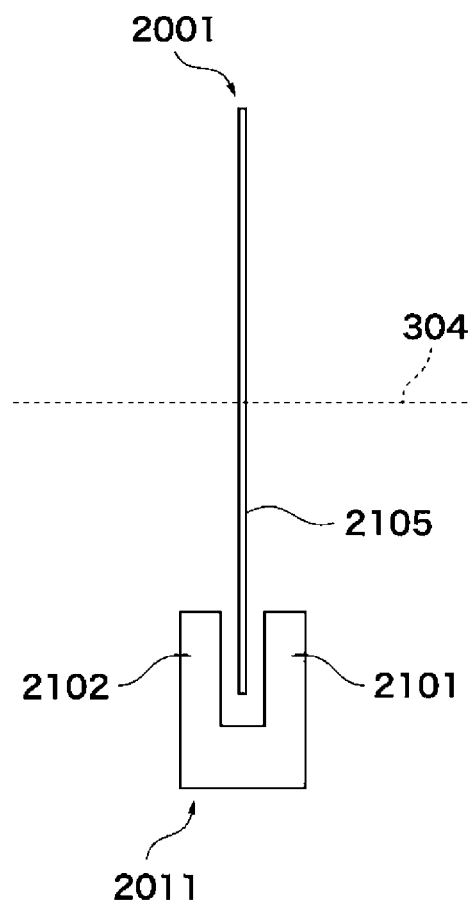
FIG. 28 is a side view showing a rotation detecting sensor and a bright film for detecting rotation of the display unit according to the third embodiment around a second axis.

FIG. 27 is an enlarged plan view showing the two-axis hinge 301 viewed from the underside of the projecting part 113 in a state where the display unit 104 is in the retracted position, and FIG. 28 is a view showing a rotation detection sensor 2011 and a bright film 2001.

Figure 29:
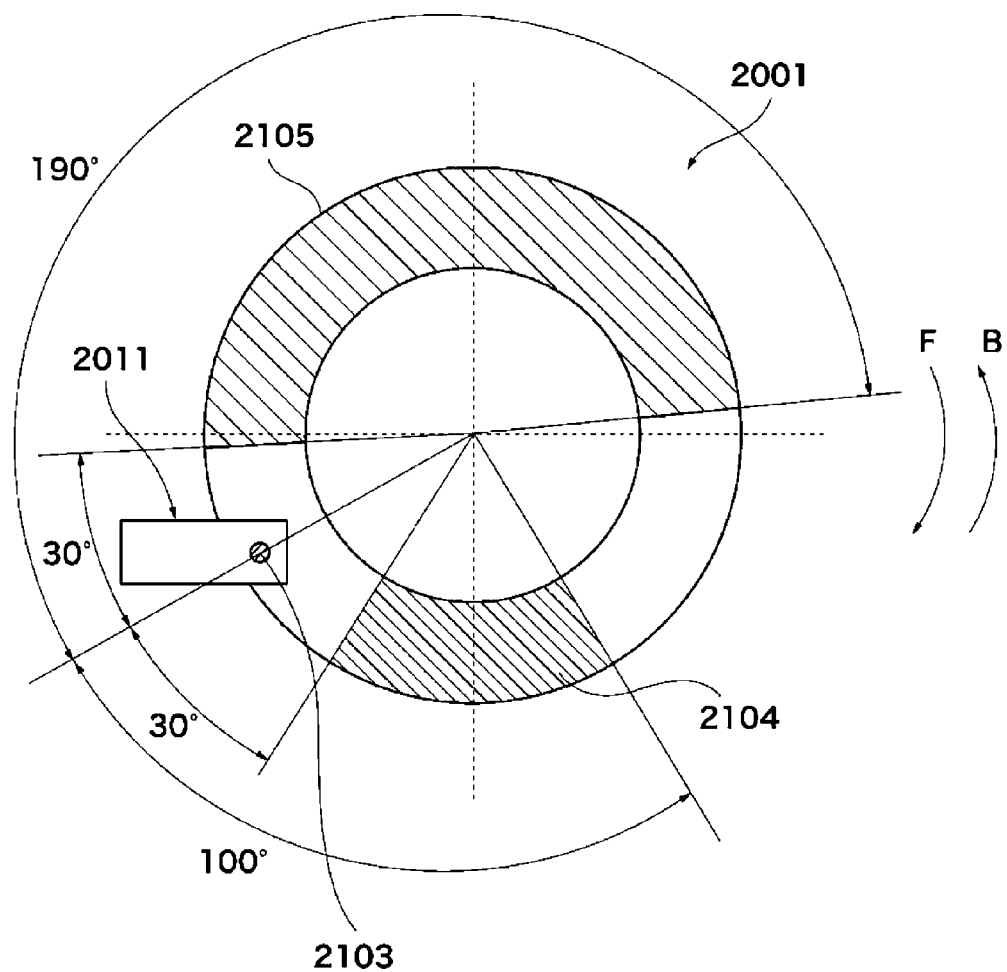
FIG. 29 is a front view showing the rotation detecting sensor and the bright film when the display unit of the digital video camera according to the third embodiment is rotated in the left direction viewed from the rear side of a camera body while turning a screen upward in the axial direction of the second axis.

FIG. 29 is a front view showing the rotation detection sensor 2011 and the bright film 2001 when the display unit 104 is rotated in the left direction viewed from the rear side of the camera body 102 while turning the screen 401 upward in the axial direction of the second axis. It should be noted that FIG. 27 shows the state where an armoring cover for the two-axis hinge 301 was detached.

As shown in FIG. 27, the digital video camera of this embodiment detects coloring sections 2104 and 2105 (see FIG. 29) of the bright film 2001 that rotate together with the second bearing 309 by the rotation detection sensor 2011 that are mounted on the printed circuit board 314 as the second axial rotation detector for detecting rotation by the second bearing 309. Here, the first and second coloring sections 2104 and 2105 are colored by mutually different densities, as shown in FIG. 29.

Then, the rotation state of the display unit 104 around the second axis 304 of the second bearing 309 is determined based on output signal from the rotation detection sensor 2011. In this embodiment, the rotation detection sensor 2011 is a transmission type photosensor (a photointerrupter etc.), the bright film 2001 is fixed to the peripheral part of the bearing 309 so that it is approximately concentric.

As shown in FIG. 28 and FIG. 29, the rotation detection sensor 2011 is provided with a light emitting section 2101, a light sensing section 2102, and a detection section 2103. The detection section 2103 can continuously measure variation of the amount of light that reaches the light sensing section 2102 among the light irradiated from the light emitting section 2101. Accordingly, the difference among transmittances of the bright section, the first coloring section 2104, and the second coloring section 2105 of the bright film 2001 can be recognized.

As shown in FIG. 29, the first coloring section 2104 is arranged within a range of 70 degrees from 30 degrees to 100 degrees in the direction of arrow B with reference to the detection section 2103 in the state where the display unit 104 is in the retracted position because of the same reason as the second embodiment. The second coloring section 2105 is arranged within a range of 160 degrees from 30 degrees to 190 degrees in the direction of arrow F with reference to the detection section 2103 in the state where the display unit 104 is in the retracted position because of the same reason as the second embodiment.

Figure 30:
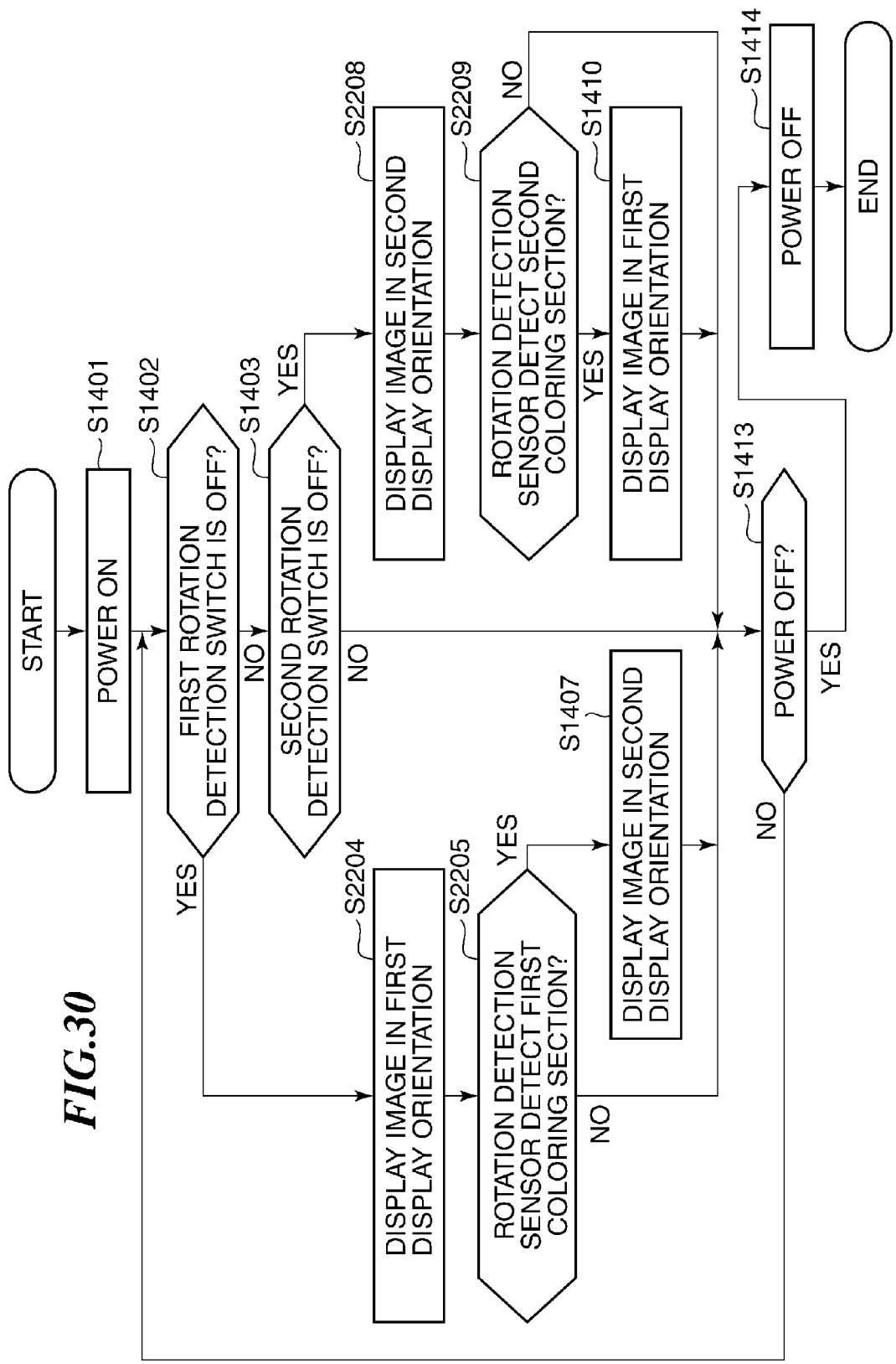
FIG. 30 is a flowchart showing an example of a display orientation switching process for an image displayed on the screen of the display unit of the digital video camera according to the third embodiment.
Figure 31:
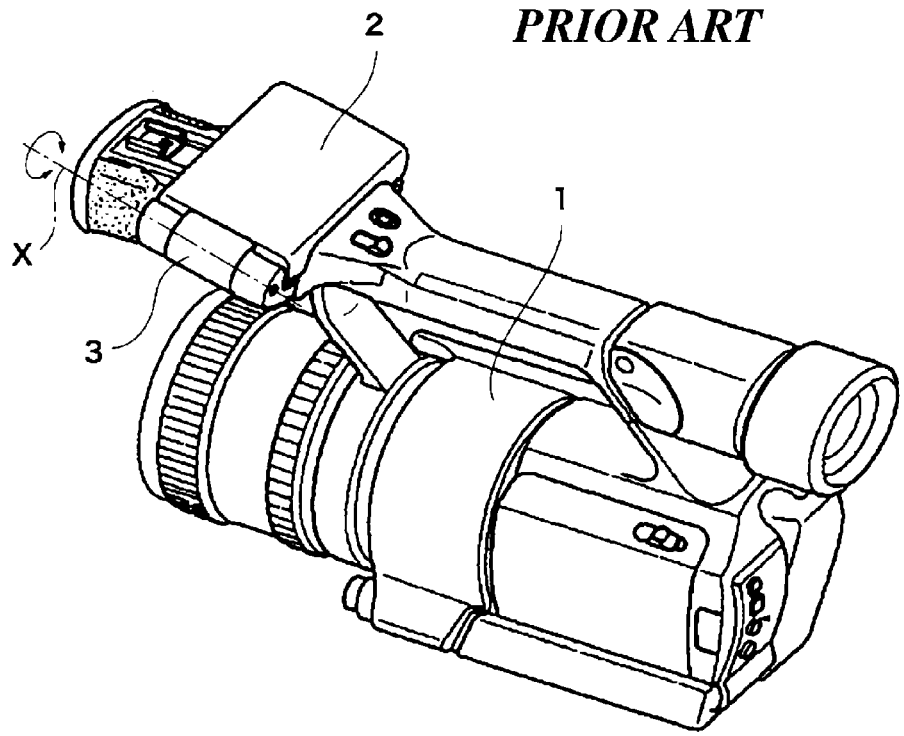
FIG. 31 is a perspective view showing a conventional digital video camera.
Figure 32:
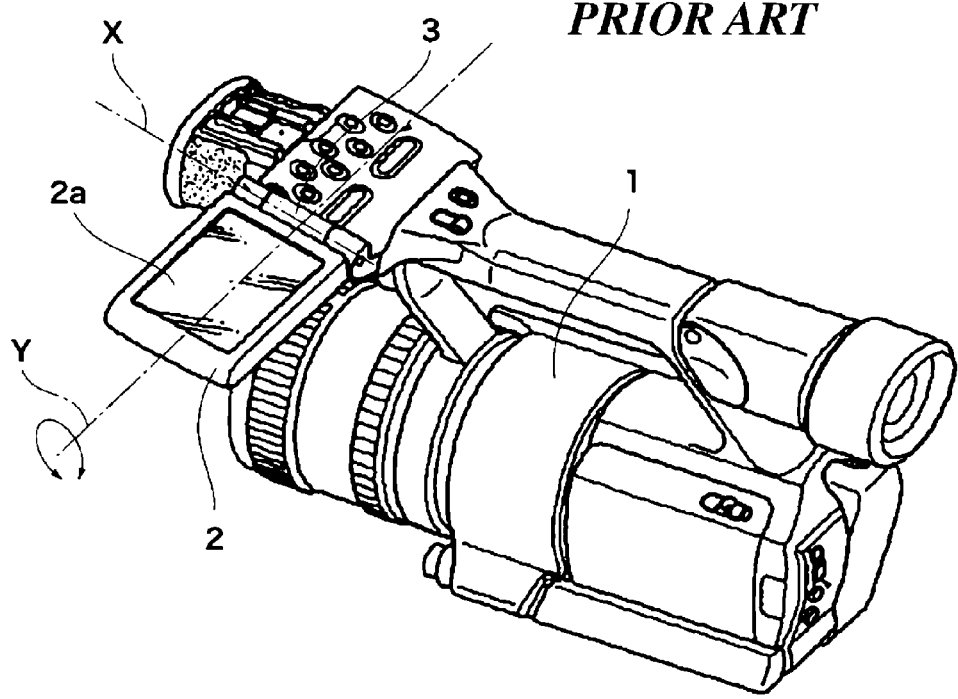
FIG. 32 is a perspective view showing the digital video camera shown in FIG. 31 in a state where a display unit opens.
Figure 33:
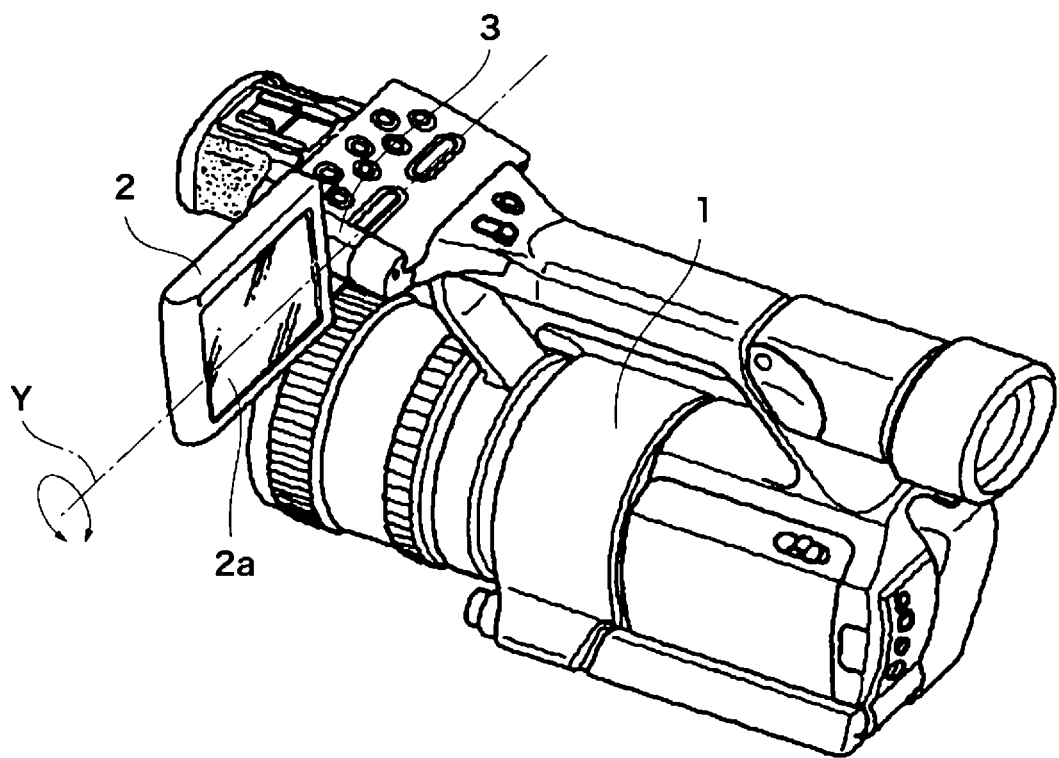
FIG. 33 is a perspective view showing the digital video camera shown in FIG. 32 in a state where the display unit turns to a rear side of a camera body.

FIG. 30 is a flowchart showing an example of a display orientation switching process for an image displayed on the screen 401 of the display unit 104. It should be noted that since the steps S1401 through step S1403, S1407, S1410, S1413, and S1414 in FIG. 30 are the same as that of the first embodiment (FIG. 18) mentioned above, the descriptions are omitted.

In the step S2204, the central control device 1303 controls the display control device 1302 to display an image on the screen 401 of the display unit 104 in the first display orientation, and proceeds with the process to the step S2205. Accordingly, when the screen 401 of the display unit 104 is turned upward as shown in FIG. 4, and when the screen 401 is turned backward as shown in FIG. 5, an erect image is displayed on the screen 401.

In the step S2205, the central control device 1303 determines whether the rotation detection sensor 2011 detects the first coloring section 2104.

When the rotation detection sensor 2011 outputs a signal indicating the detection of the first coloring section 2104, the central control device 1303 determines that the display unit 104 is rotated in the direction to turn the screen 401 toward the subject side, and proceeds with the process to the step S1407. When the rotation detection sensor 2011 does not output the signal indicating the detection of the first coloring section 2104, the central control device 1303 progresses to the step S1413.

It should be noted that the central control device 1303 controls the display control device 1302 to display an image on the screen 401 of the display unit 104 in the second display orientation in the step S1407 as mentioned above, and proceeds with the process to step S1413. Accordingly, when the display unit 104 is rotated so that the screen 401 is directed frontward as shown in FIG. 6, an erect image is displayed on the screen 401.

On the other hand, in the step S2208, the central control device 1303 controls the display control device 1302 to display an image on the screen 401 of the display unit 104 in the second display orientation, and proceeds with the process to step S2209. Accordingly, when the screen 401 of the display unit 104 is turned upward as shown in FIG. 7, and when the screen 401 is turned backward as shown in FIG. 8, an erect image is displayed on the screen 401.

In the step S2209, the central control device 1303 determines whether the rotation detection sensor 2011 detects the second coloring section 2105.

When the rotation detection sensor 2011 outputs a signal indicating the detection of the second coloring section 2105, the central control device 1303 determines that the display unit 104 is rotated in the direction to turn the screen 401 toward the subject side, and proceeds with the process to step S1410. When the rotation detection sensor 2011 does not output the signal indicating the detection of the second coloring section 2105, the central control device 1303 proceeds with the process to the step S1413.

It should be noted that the central control device 1303 controls the display control device 1302 to display an image on the screen 401 of the display unit 104 in the first display orientation in the step S1410 as mentioned above, and proceeds with the process to step S1413. Accordingly, when the display unit 104 is rotated so that the screen 401 is directed frontward as shown in FIG. 9, an erect image is displayed on the screen 401. The other configurations and operation effects are the same as that of the above-mentioned first embodiment.

It should be noted that the present invention is not limited to what has been described with the above-mentioned embodiment, quality of the material, a shape, a size, a formation, the number of elements, arrangement locations, etc., can be changed suitably unless it is deviated from the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-275773, filed on Dec. 10, 2010, which is hereby incorporated by reference herein in its entirety.

What is claimed is:
1. An image pickup apparatus comprising:
an apparatus body;
a display unit configured to be provided with a screen for displaying an image;
a two-axis hinge configured to be provided with a first bearing that supports said display unit rotatably in right and left directions from a center retracted position viewed from a rear side of said apparatus body, and a second bearing that supports said display unit in rotated states in the right and left directions rotatably so as to direct the screen to front and rear sides of said apparatus body;
a first axial rotation detector configured to detect the rotation of said display unit by the first bearing in the right and left directions;
a second axial rotation detector configured to detect the rotation of said display unit in the rotated states by the second bearing to direct the screen to the front and rear sides; and a control unit configured to switch display orientation of an image displayed on said display unit based on detection results from said first axial rotation detector and said second axial rotation detector, wherein said control unit switches the display orientation of an image displayed on said display unit according to the rotation direction of said display unit between right and left that is detected by said first axial rotation detector, and wherein said control unit switches the display orientation of an image displayed on said display unit according to the rotation direction of said display unit in the rotated states in the right and left direction between front and rear that is detected by said second axial rotation detector.

2. The image pickup apparatus according to claim 1, wherein said first axial rotation detector is provided with an action type detection switch.

3. The image pickup apparatus according to claim 2, wherein said first axial rotation detector is provided with a first rotation detection switch for detecting the rotation of said display unit in the left direction and a second rotation detection switch for detecting the rotation of said display unit in the right direction.

4. The image pickup apparatus according to claim 1, wherein said second axial rotation detector is provided with an action type rotation detection switch.

5. The image pickup apparatus according to claim 4, wherein said second axial rotation detector is provided with a third rotation detection switch for detecting the rotation of said display unit in the rotated state in the right direction to direct the screen to the front and rear sides, and a fourth rotation detection switch for detecting the rotation of said display unit in the rotated state in the left direction to direct the screen to the front and rear sides.

6. The image pickup apparatus according to claim 1, wherein said second axial rotation detector is provided with a transmission type photosensor having a light emitting section and a light sensing section, and a bright film that passes a gap between the light emitting section and the light sensing section and that differs in transmittance according to a rotation position.

7. The image pickup apparatus according to claim 6, wherein said second axial rotation detector is provided with a first rotation detection sensor and a first bright film that detect the rotation of said display unit in the rotated state in the right direction to direct the screen to the front and rear directions, and a second rotation detection sensor and a second bright film that detect the rotation of said display unit in the rotated state in the left direction to direct the screen to the front and rear directions.

8. The image pickup apparatus according to claim 6, wherein said second axial rotation detector comprises a rotation detection sensor and a bright film, and wherein said bright film has a first coloring section for detecting the rotation of said display unit in the rotated state in the right direction to direct the screen to the front and rear directions, and a second coloring section having different transmittance from the first coloring section for detecting the rotation of said display unit in the rotated state in the left direction to direct the screen to the front and rear directions.

* * * * *